US005788342A

United States Patent [19]

Noguchi

[11] Patent Number: 5,788,342
[45] Date of Patent: Aug. 4, 1998

[54] BRAKING SYSTEM HAVING PUMP CONNECTED TO TWO BRAKE CYLINDERS THROUGH RESPECTIVE DELIVERY PORTS THAT ARE DISCONNECTED FROM EACH OTHER IN A PORTION OF DELIVERY STROKE OF THE PUMP

[75] Inventor: Noboru Noguchi, Nagoya, Japan

[73] Assignee: Toyota Jidosha Kabushiki Kaisha, Toyota, Japan

[21] Appl. No.: 614,033

[22] Filed: Mar. 12, 1996

[30] Foreign Application Priority Data

Mar. 13, 1995 [JP] Japan ................... 7-052660

[51] Int. Cl.⁶ ................... B60T 8/48
[52] U.S. Cl. ................... 303/116.2; 303/116.1; 303/10
[58] Field of Search .............. 303/10, 15, 113.2, 303/115.4, 116.1, 116.2, 116.4, 140, 146, 148, 149, 150, 163–165, 169, 170, 187; 417/305; 60/533

[56] References Cited

U.S. PATENT DOCUMENTS

| | | | |
|---|---|---|---|
| 4,818,038 | 4/1989 | Ocvirk et al. | 303/113.2 |
| 4,883,327 | 11/1989 | Farr | 303/116.4 |
| 4,940,294 | 7/1990 | Foster | 303/116.4 |
| 4,962,972 | 10/1990 | Pizzo | 303/10 |
| 5,011,235 | 4/1991 | Arikawa | 303/170 |
| 5,242,216 | 9/1993 | Miyawaki et al. | 303/167 |
| 5,350,226 | 9/1994 | Burgdorf et al. | 303/116.2 |
| 5,531,514 | 7/1996 | Nisuii et al. | 303/116.2 |

FOREIGN PATENT DOCUMENTS

| | | |
|---|---|---|
| WO-A-9015738 | 12/1990 | European Pat. Off. |
| 0 435 114 | 7/1991 | European Pat. Off. |
| 28 30 580 | 6/1989 | Germany |
| 38 15 732 | 11/1989 | Germany |
| A-4029407 | 8/1991 | Germany |
| 54-49472 | 4/1979 | Japan |
| 5-50910 | 3/1993 | Japan |
| A-2192962 | 1/1988 | United Kingdom |
| 2 272 031 | 5/1994 | United Kingdom |

Primary Examiner—Robert J. Oberleitner
Assistant Examiner—Chris Schwartz
Attorney, Agent, or Firm—Kenyon & Kenyon

[57] ABSTRACT

A braking system including two brake cylinders, a pump adapted to pressurize a fluid received from a reservoir and distribute the pressurized fluid to the two brake cylinders, a solenoid-operated pressure control device disposed between the reservoir and pump and the two brake cylinders, and a controller for controlling the pressure control device for regulating the pressures in the two brake cylinder. The pump includes a piston in a cylinder bore formed so as to partially define a pump chamber that communicates (i) with the reservoir through a suction port and (ii) with the two brake cylinders through respective two delivery reports. The piston reciprocates to change the volume of the pump chamber, which in turn alternatively repeats between a suction and a delivery stroke. The pump includes a device for disconnecting the two delivery ports from each other in at least a portion of the delivery stroke of the piston.

13 Claims, 10 Drawing Sheets

| | DISTRIBUTION RATIOS OF PUMP DELIVERY TO FRONT AND REAR WHEEL BRAKE CYLINDERS (FRONT : REAR) | | | |
|---|---|---|---|---|
| | PRESENT SYSTEM | | KNOWN SYSTEM | |
| $\mu$-DIFFERENCE INFLUENCE COEFFICIENT $\alpha$ | 0 | 0.5 | 0 | 0.5 |
| FIRST SUB-SYSTEM | 2:1 | 1:1 | 1:1 | 1:1 |
| SECOND SUB-SYSTEM | 2:1 | 1:2 | 1:1 | 0:1 |

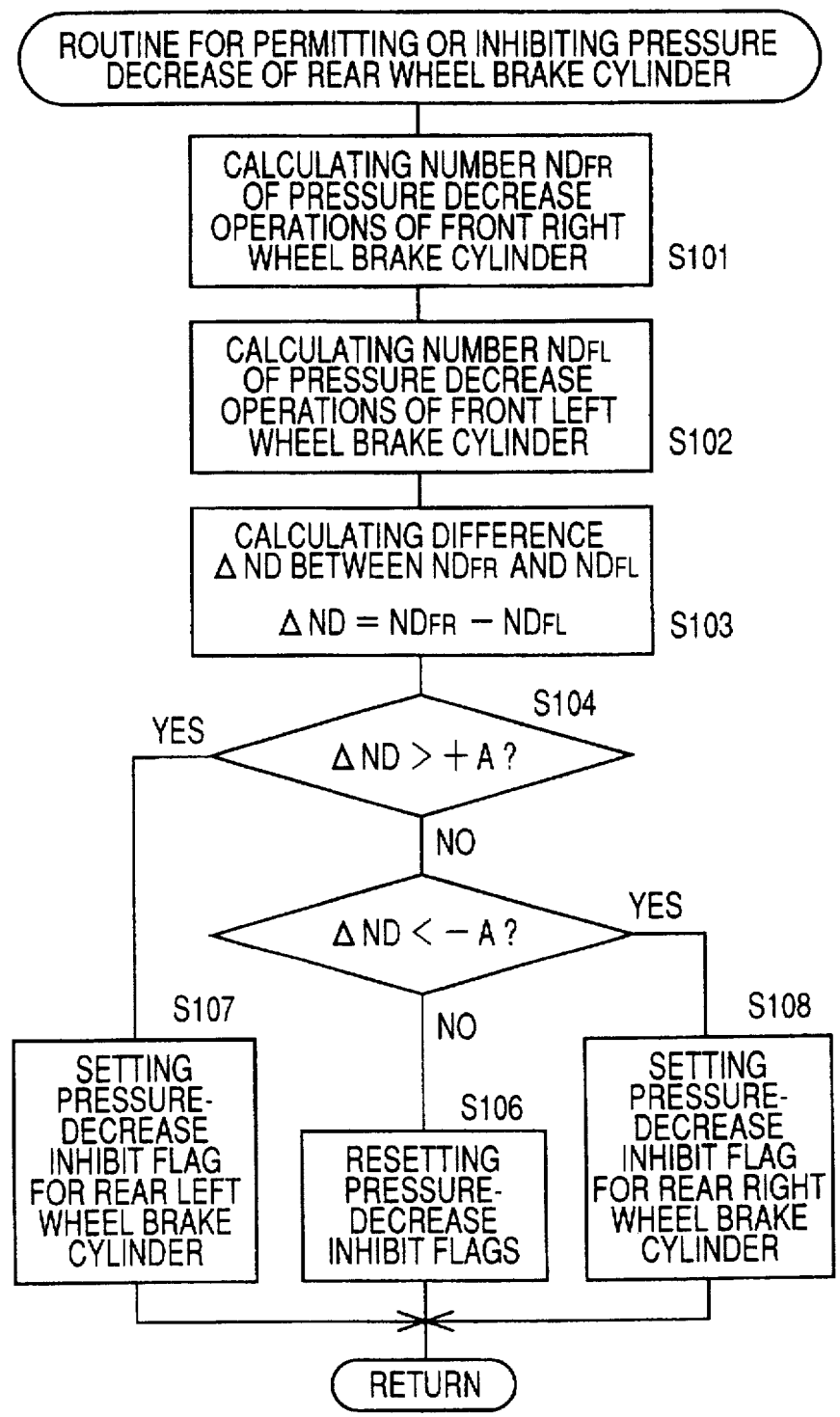

BRAKING SYSTEM HAVING PUMP CONNECTED TO TWO BRAKE CYLINDERS THROUGH RESPECTIVE DELIVERY PORTS THAT ARE DISCONNECTED FROM EACH OTHER IN A PORTION OF DELIVERY STROKE OF THE PUMP

BACKGROUND OF THE INVENTION

1. Field of the Invention

The present invention relates in general to a braking system wherein a pressurized working fluid delivered from a pump is distributed to two brake cylinders to increase braking pressures in these two brake cylinders, and more particularly to a technique for increasing a rate of increase of a higher one of the braking pressures in the two brake cylinders.

2. Discussion of the Related Art

In some conditions of a motor vehicle, a braking system for the vehicle is required to be electrically controlled to regulate the braking pressures in brake cylinders for the wheels of the vehicle (hereinafter referred to as "wheel brake cylinder pressures" where appropriate. For instance, the braking system is electrically controlled to effect an anti-lock control of the wheel brake cylinder pressures so as to avoid locking or skidding of the wheels upon braking of the vehicle, or to effect a braking-effect monitoring control of the wheel brake cylinder pressures so that an actual braking effect as represented by a detected deceleration of the vehicle due to the brake application coincides with a target value desired by the vehicle operator, irrespective of fluctuating factors such as a variation in the friction coefficient of friction members of the brakes actuated by the wheel brake cylinders.

An example of this type of motor vehicle braking system is disclosed in JP-A-63-34272 (published in 1988), which includes (a) a reservoir, (b) two wheel brake cylinders, (c) a pump which is adapted to pressurize a working fluid received from the reservoir and distribute the pressurized fluid to the two wheel brake cylinders and which has a piston received in a cylinder bore formed in a housing such that the cylinder bore is closed at one end thereof and such that the piston and the housing cooperate to define a pump chamber to which there are open a suction port connected to the reservoir and a delivery port connected to the two wheel brake cylinders, the piston being reciprocated in the cylinder bore to change the volume of the pump chamber for thereby repeating alternate suction and delivery strokes, (d) a solenoid-operated pressure control device disposed between the reservoir and pump and the two wheel brake cylinders, and (e) a controller for controlling the solenoid-operated pressure control device for thereby regulating the pressures of the working fluid in the wheel brake cylinders, namely, wheel brake cylinder pressures.

However, the braking system of the type as described above has the following problem that should be solved.

In the braking system in question, the pressurized working fluid delivered from the same pump is distributed to the two wheel brake cylinders to increase the wheel brake cylinder pressures. In this arrangement, a difference between the pressures in the two wheel brake cylinders will cause a difference between the rates of increase of the wheel brake cylinder pressures. More specifically described, the rate of increase of the higher one of the pressures in the two wheel brake cylinders is lower than that of the lower one of the pressures of these two wheel brake cylinders.

The braking system of the type described above may have two mutually independent pressure application sub-systems.

In one form of the braking system referred to as "front-rear independent type", one of the two pressure application sub-systems is provided for the two brake cylinders for the front right and left wheels of the vehicle, while the other pressure application sub-system is provided for the two brake cylinders for the rear right and left wheels. In another form of the braking system referred to as "diagonal or X-crossing type", one of the two pressure application sub-systems is provided for the two brake cylinders for the front left wheel and the rear right wheel, while the other sub-system is provided for the two brake cylinders for the front right wheel and the rear left wheel. The road surface on which the vehicle runs may be uneven in the friction coefficient. That is, the road surface may be an uneven-friction-coefficient road surface, which has right and left areas which have different friction coefficients μ and on which the right and left wheels lie, respectively. In the braking system of the diagonal or X-crossing type, in particular, it is generally required to increase the pressure of the front wheel brake cylinder in one of the two pressure application sub-systems in which the front wheel lies on one of the right and left areas of the uneven-friction-coefficient road surface which has the higher friction coefficient, while the rear wheel lies on the other area having the lower friction coefficient. The above-identified one area is referred to as "higher-μ road surface area", while the other area is referred to as "lower-μ road surface area". If the pressure of the front wheel brake cylinder in one of the two pressure application sub-systems itensified curve cannot be increased at a sufficiently high rate, the comparatively higher friction coefficient of the higher-μ road surface area cannot be sufficiently utilized by the front wheel to effectively brake the motor vehicle, even when the load acting on the front wheel is made higher than that of the rear wheel as a result of a load shift from the rear wheel to the front wheel by an initial braking effect.

The braking system of the diagonal or X-crossing type may be adapted such that during running of the vehicle on the uneven-friction-coefficient road surface, the pressure of the rear wheel brake cylinder (hereinafter referred to as "higher-μ rear wheel brake cylinder") in the sub-system in which the rear wheel lies on the higher-μ road surface area is controlled in the same manner as the pressure of the rear wheel brake cylinder (hereinafter referred to as "lower-μ rear wheel brake cylinder") in the other sub-system in which the rear wheel lies on the lower-μ road surface area. This type of X-crossing braking system is generally referred to as "select-low control type" wherein the pressures in the higher-μ and lower-μ wheel brake cylinders in the two pressure application sub-systems are controlled as described above, namely, in a "select-low control" fashion.

In the select-low control type X-crossing braking system, the anti-lock control of the pressure of the lower-μ rear wheel brake cylinder is effected during running of the vehicle on the uneven-friction-coefficient road surface will effect the anti-lock control of the pressure of the higher-μ rear wheel brake cylinder. In this case, the pressure of the lower-μ rear wheel brake cylinder is controlled in a manner depending upon the locking tendency of the rear wheel lying on the lower-μ road surface area, while the pressure of the higher-μ rear wheel brake cylinder is not controlled in a manner depending upon the locking tendency of the rear wheel lying on the higher-μ road surface area, but is controlled in the manner determined for the lower-μ rear wheel brake cylinder. As a result, the pressure of the higher-μ rear wheel brake cylinder is controlled in the same manner as the pressure of the lower-μ rear wheel brake cylinder.

In the above case, the higher-μ rear wheel will not have a locking tendency even if the pressure of the higher-μ rear wheel brake cylinder is further increased. However, a further increase of the pressure of the higher-μ rear wheel brake cylinder is not achieved according to the above arrangement, for increasing the side or lateral force acting on the higher-μ rear wheel to thereby improve the running stability of the vehicle. In other words, the braking force applied to the higher-μ rear wheel is sacrificed for the sake of improving the vehicle running stability. In this arrangement, therefore, it is desirable to minimize a decrease in the rate of increase in the pressure of the higher-μ rear wheel brake cylinder as compared with the pressure of the lower-μ rear wheel brake cylinder, from the standpoint of minimizing the required braking distance of the vehicle. In the pressure application sub-system including the higher-μ rear wheel brake cylinder, however, the front wheel lies on the lower-μ road surface area, and the pressure of the front wheel brake cylinder is therefore also reduced in the anti-lock fashion, whereby the delivery pressure of the pump is almost equal to the pressures of the front and rear wheel brake cylinders in the above-identified sub-system. The delivery pressure of the pump is lower when the select-low control of the pressure of the higher-μ rear wheel brake cylinder is effected than when it is not effected. This means that the delivery pressure of the pump in the above-identified sub-system is made lower than in the other sub-system. Consequently, the rate of increase of the pressure of the higher-μ rear wheel brake cylinder is made lower than that of the lower-μ rear wheel brake cylinder, leading to an unnecessarily large amount of sacrifice of the required braking distance of the vehicle with respect to the higher-μ rear wheel.

Thus, the known braking system as described above does not permit a sufficiently high rate of increase of the pressure of one of the two brake cylinders which pressure is either actually higher or should be higher than that of the other brake cylinder. Therefore, the known braking system is not capable of applying a sufficiently high braking force to the corresponding wheel. The above-indicated one of the two brake cylinders will be referred to as "higher-pressure brake cylinder", while the other brake cylinder will be referred to as "lower-pressure brake cylinder", in the interest of simplification.

SUMMARY OF THE INVENTION

It is therefore a first object of the present invention to provide a braking system which includes a pump adapted to distribute a pressurized working fluid to two brake cylinders and in which a pump chamber of the pump is connected to only the higher-pressure brake cylinder and is disconnected from the lower-pressure brake cylinder under a predetermined condition, so as to increase the pressure of the higher-pressure brake cylinder at a sufficiently high rate.

It is a second object of this invention to provide a diagonal or X-crossing braking system of select-low control type for a four-wheel motor vehicle, which has two mutually independent pressure application sub-systems each having a pump adapted to distribute a pressurized working fluid to two wheel brake cylinders, and wherein the pressures of the rear right and left wheel brake cylinders are controlled in the above-described select-low control fashion during an anti-lock control of those pressures such that the manner of controlling the pressure of the higher-μ rear wheel brake cylinder is made different from that of the lower-μ rear wheel brake cylinder, in order to assure a higher rate of overall increase of the pressure of the higher-μ rear wheel brake cylinder than in the conventional braking system.

The above first object may be achieved according to a first aspect of this invention, which provides a braking system comprising: a reservoir; two brake cylinders; a pump adapted to pressurize a working fluid received from the reservoir and distribute the pressurized fluid to the two brake cylinders, the pump having a cylinder bore and including a piston received in the cylinder bore formed in the housing such that the cylinder bore is closed at one end thereof and such that the piston and the housing cooperate to define a pump chamber which is connected to the reservoir through a suction port and also connected to the two brake cylinders, the piston being reciprocated so as to change a volume of the pump chamber for thereby repeating a suction and a delivery stroke alternately; a solenoid-operated pressure control device disposed between the reservoir and pump and the two brake cylinders; and a controller for controlling the solenoid-operated pressure control device to electrically regulate pressures of the working fluid in the two brake cylinders, and wherein the pump has two delivery ports which are open to the pump chamber and which are mutually independently connected to the two brake cylinders, respectively, and the pump comprises disconnecting means for disconnecting the two delivery ports from each other in at least a portion of the delivery stroke of the piston.

In the conventional braking system in which the pump chamber is connected to the two brake cylinders through the same delivery port, the two brake cylinders are necessarily connected to the pump chamber when the solenoid-operated pressure control device is placed in the position for simultaneously increasing the pressures in the two brake cylinders. When there is a difference between the pressures in the two brake cylinders during simultaneous increase of the pressures by the fluid pressurized by the pump, the pressurized fluid is less likely to be fed to one of the two brake cylinders which has the higher pressure, while the pressurized fluid is more likely to be fed to the other brake cylinder whose pressure is lower.

In the braking system according to the present invention as described above, the pump has the two delivery ports which are connected mutually independently to the respective two brake cylinders, and the pump comprises the disconnecting means for disconnecting the two delivery ports from each other in at least a portion of the delivery stroke of the piston. In other words, the delivery stroke of the piston includes a disconnecting time period in which which the two delivery ports are disconnected from each other. During this disconnecting time period, t he pressure in the brake cylinder currently communicating with the pump chamber can be regulated by the pressurized fluid delivered from the pump chamber, irrespective of the actual pressure difference between the two brake cylinders.

If the pump of the present braking system is constructed so that one of the two brake cylinders which has a higher pressure is communicated with the pump chamber during the above-indicated disconnecting time period, the pressure in this higher-pressure brake cylinder can be increased at a higher rate, than in the conventional braking system in which the two brake cylinders are necessarily communicated with each other through the pump chamber.

Thus, th e provision of the disconnecting means makes it possible to optimize the distribution ratio of the pressurized fluid delivered from the pump to the two brake cylinders, permitting a sufficiently high rate of increase of the pressure in one of the two brake cylinders which has a higher pressure. As a result, the rate of increase of the pressures in the two brake cylinders as a whole can be made sufficiently high, providing an improvement in the vehicle braking effect of the braking system.

In one preferred form of the braking system described above, the two delivery ports are formed in the housing so as to be open to the pump chamber at respective positions which are spaced apart from each other in a direction of reciprocation of the piston, and the piston includes a front end portion which partially defines the pump chamber and which functions as a valve spool for opening and closing, during reciprocation of the piston, only one of the two delivery ports which is located nearer than the other of the two delivery ports, to a fully retracted position of the piston at which the volume of the pump chamber is the largest.

In this form of the braking system, the delivery port remote from the fully retracted position of the piston (nearer to the fully advanced position at which the volume of the pump chamber is the smallest) is kept open when the delivery port nearer to the fully retracted position is closed by the valve spool, that is, by the front end portion of the piston. Thus, in a portion of the delivery stroke of the piston, the two delivery ports are disconnected from each other such that only one of the delivery ports which is nearer to the fully advanced position of the piston is communicated with the pump chamber.

If the delivery port which is nearer to the fully advanced position of the piston and which is communicated alone with the pump chamber in the above-indicated portion of the delivery stroke is connected to one of the two brake cylinders which has a higher pressure, the pressure of this higher-pressure brake cylinder can be increased at a sufficiently high rate by the pressure delivered from the pump chamber, since the other delivery port is closed by the valve spool in the above portion of the delivery stroke.

In connection with the above preferred form of the invention, it is noted that the higher-pressure brake cylinder is not always fixed. In other words, either one of the two brake cylinders may be the higher-pressure brake cylinder having a higher pressure. Therefore, it is desirable to determine which one of the two brake cylinders is the higher-pressure brake cylinder, and connect the permanently open delivery port (nearer to the fully advanced position of the piston) to the determined higher-pressure brake cylinder. In a diagonal or X-crossing braking system wherein each pressure application sub-system has a front wheel brake cylinder and a rear wheel brake cylinder, a larger braking effect can be obtained by increasing the rate of increase of the pressure in the front wheel brake cylinder, since a larger load acts on the front wheel by a load shift due to an initial braking effect in each pressure application sub-system. In view of this fact, the diagonal type braking system may be adapted such that the permanently open delivery port nearer to the fully advanced position of the piston is held connected to the front wheel brake cylinder.

According to the above preferred form of the braking system, the disconnecting means for optimizing the rates of increase of the pressures in the two brake cylinders merely requires the two delivery ports to be spaced apart from each other in the direction of reciprocation of the piston, and does not require the pump to have a complicated construction.

According to another preferred form of the braking system, the two delivery ports are formed in the housing so as to be open to the pump chamber at respective positions which are spaced apart from each other in a direction of reciprocation of the piston, as in the above preferred form of the braking system. Further, the piston includes a front end portion, a rear end portion, and an axially intermediate portion between the front and rear end portions. The axially intermediate portion has an annular groove formed in an outer circumferential surface thereof and held in communication with the pump chamber. The front end portion functions as a valve spool for opening and closing the two delivery ports during reciprocation of the piston such that one of the two delivery ports is open while the other of the two delivery ports is closed.

In the above form of the invention, the delivery port nearer to the fully retracted position of the piston is closed when the delivery port nearer to the fully advanced position is open. Conversely, the delivery port near to the fully advanced position is closed when the delivery port nearer to the fully retracted position is open. Thus, the two delivery ports are held disconnected from each other during the entire delivery stroke of the piston in which only one of the two delivery ports is communicated with the pump chamber while the other delivery port is disconnected from the pump chamber.

In the present preferred form of the braking system wherein the two delivery ports are always disconnected from each other, the pressures in the two brake cylinders alternately communicated with the pump chamber through the two delivery ports can be increased at a rate considerably higher than that in the conventional braking system.

The second object indicated above may be achieved according to a second aspect of the present invention, which provides a braking system of diagonal or X-crossing type for a four-wheel motor vehicle having a front right, a front left, a rear right and a rear left wheel, said braking system comprising two pressure application sub-systems which are connected to respective two pressurizing chambers of a master cylinder, each of the sub-systems including (a) a reservoir, (b) a front wheel brake cylinder for one of the front right and left wheels, and a rear wheel brake cylinder for one of the rear right and left wheels which is located diagonally with respect to the one of the front right and left wheels, (c) a pump adapted pressurize a working fluid received from the reservoir and distribute the pressurized fluid to the front and rear wheel brake cylinders, and (d) a solenoid-operated pressure control device disposed between the reservoir and pump and the front and rear wheel brake cylinders, the braking system comprising a controller for controlling the solenoid-operated pressure control device of the each pressure application sub-system to electrically regulate pressures of the working fluid in the front and rear wheel brake cylinders of the each sub-system in an anti-lock manner so as to prevent locking of the corresponding wheels, such that during running of the motor vehicle on an uneven-friction-coefficient road surface whose right and left areas have different friction coefficients, the pressure in the rear wheel brake cylinder which belongs to one of the two sub-systems and which corresponds to the rear wheel lying on one of the right and left areas which has a higher friction coefficient is controlled in the same manner as the pressure in the rear wheel brake cylinder which belongs to the other of the two sub-systems and which corresponds to the rear wheel lying on the other area having a lower friction coefficient, wherein the controller controls the solenoid-operated pressure control devices of the two pressure application sub-systems such that when a difference between the friction coefficients of the right and left areas of the uneven-friction-coefficient road surface is larger than a predetermined threshold, the pressure control devices are controlled to effect at least one of: shortening a pressure-decrease time during which the pressure in the rear wheel brake cylinder belonging to the above-indicated one of the two sub-systems is reduced, as compared with a pressure=decrease time during which the pressure in the rear wheel brake cylinder belonging to the other of the two sub-systems is reduced; and increasing a pressure-increase time during which the pressure in the rear wheel brake cylinder belonging to the above-indicated one of the two sub-system is increased, as compared with a pressure-increase time during which the pressure in the rear wheel brake cylinder belonging to the other sub-system is increased.

The term "pressure-decrease time" may be represented by the length of each of pressure reducing operations performed for the appropriate rear wheel brake cylinder in a series of anti-lock pressure control operations of the braking system. Alternatively, the term "pressure-decrease time" may be represented by the number of the pressure reducing operations performed for the appropriate rear wheel brake cylinder in the series of anti-lock pressure control operations. The term "pressure-increase time" is similarly interpreted.

The diagonal or X-crossing type braking system constructed according to the second aspect of this invention is adapted to suitably regulate the pressures in the two rear wheel brake cylinders of the two pressure application sub-systems even when the vehicle is running on an uneven-friction-coefficient road surface, more specifically, even when the difference between the friction coefficients of the right and left road surface areas is larger than the predetermined threshold. For convenience sake, the road surface area having a higher friction coefficient is referred to as "higher-µ road surface area", and the rear wheel lying on this higher-µ road surface area is referred to as "higher-µ rear wheel". Further, the rear wheel brake cylinder for the higher-µ rear wheel is referred to as "higher-µ rear wheel brake cylinder". Similarly, the other road surface area, the other rear wheel and the other rear wheel cylinder are referred to as "lower-µ road surface area", "lower-µ rear wheel" and "lower-µ rear wheel brake cylinder".

When the difference of the friction coefficients of the higher-µ and lower-µ road surface areas differs, the controller controls the solenoid-operated pressure control devices of the two pressure application sub-systems so as to shorten the pressure-decrease time and/or increase the pressure-increase time of the higher-µ rear wheel brake cylinder of one of the two sub-systems corresponding to the higher-µ rear wheel lying on the higher-µ road surface area, as compared with the pressure-decrease time and/or the pressure-increase time of the other lower-µ rear wheel brake cylinder of the other sub-system corresponding to the other lower-µ rear wheel lying on the lower-µ road surface area.

According to the select-low control of the pressures in the two rear wheel brake cylinders, the delivery pressure of the pump of the sub-system corresponding to the higher-µ rear wheel brake cylinder is lowered, and the pressure in this higher-µ rear wheel brake cylinder cannot be increased at a sufficiently high rate. In the present braking system, however, the controller controls the solenoid-operated pressure control valves so as to effect at least one of shortening the pressure-decrease time and increasing the pressure-increase time of the higher-µ rear wheel brake cylinder, so that the overall rate of increase of the pressure in the higher-µ rear wheel brake cylinder is increased to a sufficient value. Described more specifically, the anti-lock pressure control operations usually include two or more pressure control modes including at least the pressure-decrease mode and the pressure-increase mode for each wheel brake cylinder. Although the select-low control results in a lower rate of increase of the pressure in the higher-µ rear wheel brake cylinder in the pressure-increase mode as compared with a rate of increase of the pressure in the lower-µ rear wheel brake cylinder, the present control arrangement permits an increase in the overall rate of increase of the pressure in the higher-µ rear wheel brake cylinder in all the pressure control modes (including the pressure-decrease and pressure-increase modes), since the pressure-decrease time in the pressure-decrease mode is shortened for the higher-µ rear wheel brake cylinder, and/or the pressure-increase time in the pressure-increase mode is increased for the higher-µ rear wheel brake cylinder.

Thus, the present braking system permits an improved braking effect owing to an increased overall rate of increase of the higher-µ rear wheel brake cylinder, in spite of the select-low control of the pressures in the two rear wheel brake cylinders in the diagonal or X-crossing two pressure application sub-systems. Since this increase in the overall rate of increase of the pressure in the higher-µ rear wheel brake cylinder is achieved by a specific software control program incorporated in the controller, the braking system is still available at a relatively low cost.

In one preferred form of the diagonal type braking system according to the second aspect of the invention, the controller comprises: friction-coefficient difference determining means for determining whether the difference between the friction coefficients of the right and left areas of the uneven-friction-coefficient road surface is larger than the predetermined threshold; select-low control means operated when the friction-coefficient difference determining means has determined that the difference is larger than the predetermined threshold, for selecting for the lower-µ rear wheel brake cylinder (belonging to the above-indicated other sub-system), one of a plurality of pressure control modes including a pressure-decrease mode and a pressure-increase mode, depending upon a locking tendency of the corresponding lower-µ rear wheel, so that the selected pressure control mode is suitable for holding a slip ratio of the lower-µ rear wheel within a predetermined optimum range, the select-low control means provisionally selecting for the higher-µ rear wheel brake cylinder (belonging to the above-indicated one sub-system), the pressure control mode which has been selected for the lower-µ rear wheel brake cylinder; and adjusting means for changing the pressure control mode provisionally selected by the select-low control means, such that the number of pressure-decrease operations to be performed for the higher-µ rear wheel brake cylinder during a series of anti-lock pressure control operations of the braking system is smaller than the number of pressure-decrease operations to be performed for the lower-µ rear wheel brake cylinder.

In one advantageous arrangement of the above preferred form of the diagonal type braking system of the invention, the friction-coefficient difference determining means comprises: means for obtaining a first number of pressure-decrease operations which have been performed in a predetermined time period during the series of anti-lock pressure control operations, for the lower-µ front wheel brake cylinder which belongs to the above-indicated one sub-system and which corresponds to the front wheel lying on the other area having a lower friction coefficient; means for obtaining a second number of pressure-decrease operations which have been performed in the predetermined time period during the series of anti-lock pressure control operations, for the higher-µ front wheel brake cylinder which belongs to the other sub-system and which corresponds to the front wheel lying on the above-indicated one area having a higher friction coefficient; means for obtaining an absolute value of a difference between the first and second numbers of pressure-decrease operations; and means for determining that the difference between the friction coefficients of the right and left areas of the road surface is larger than the predetermined threshold, if the absolute value is larger than a predetermined reference value.

In another advantageous arrangement of the above form of the diagonal type braking system, the friction-coefficient difference determining means comprises: means for obtaining a first number of pressure decrease-operations which have been performed in a predetermined time period during the series of anti-lock pressure control operations, for the lower-μ front wheel brake cylinder which belongs to the above-indicated one sub-system and which corresponds to the front wheel lying on the other area having a lower friction coefficient; means for obtaining a second number of pressure-decrease operations which have been performed in the predetermined time period during the series of anti-lock pressure control operations, for the higher-μ front wheel brake cylinder which belongs to the other sub-system and which corresponds to the front wheel lying on the above-indicated one area having a higher friction coefficient; means for obtaining a ratio by dividing the first number by the second number; and means for determining that the difference between the friction coefficients of the right and left areas of the road surface is larger than the predetermined threshold, if the ratio is larger than a predetermined reference value.

According to another preferred form of the diagonal type braking system of the invention, when the select-low control means provisionally selects the pressure-decrease mode for the higher-μ rear wheel brake cylinder as well as for the lower-μ rear wheel brake cylinder, the adjusting means replaces the provisionally selected pressure-decrease mode to the pressure-increase mode or a pressure-hold mode, to thereby inhibit at least one of the pressure-decrease operations to be performed for the higher-μ rear wheel brake cylinder, after the friction-coefficient difference determining means has determined that the difference is larger than the predetermined threshold, whereby the number of the pressure-decrease operations to be performed for the higher-μ rear wheel brake cylinder during the series of anti-lock pressure control operations is smaller than the number of the pressure-decrease operations to be performed for the lower-μ rear wheel brake cylinder.

According to a further preferred form of the diagonal type braking system, the controller inhibits, for a predetermined time, a change of the pressure control mode for the higher-μ rear wheel brake cylinder, from the pressure-increase mode to another of the plurality of pressure control modes which is selected by the select-low control means for the lower-μ rear wheel brake cylinder, after the friction-coefficient difference determining means has determined that the difference is larger than the predetermined threshold, so that a total pressure-increase time during which the pressure in the higher-μ rear wheel brake cylinder is increased during the series of anti-lock pressure control operations is made longer than that of the lower-μ rear wheel brake cylinder.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 12 is a flow chart illustrating a routine executed by a computer of a controller to permit and inhibit reduction of the braking pressure in a rear wheel brake cylinder of the vehicle.

DETAILED DESCRIPTION OF THE PREFERRED EMBODIMENTS

Figure 1:
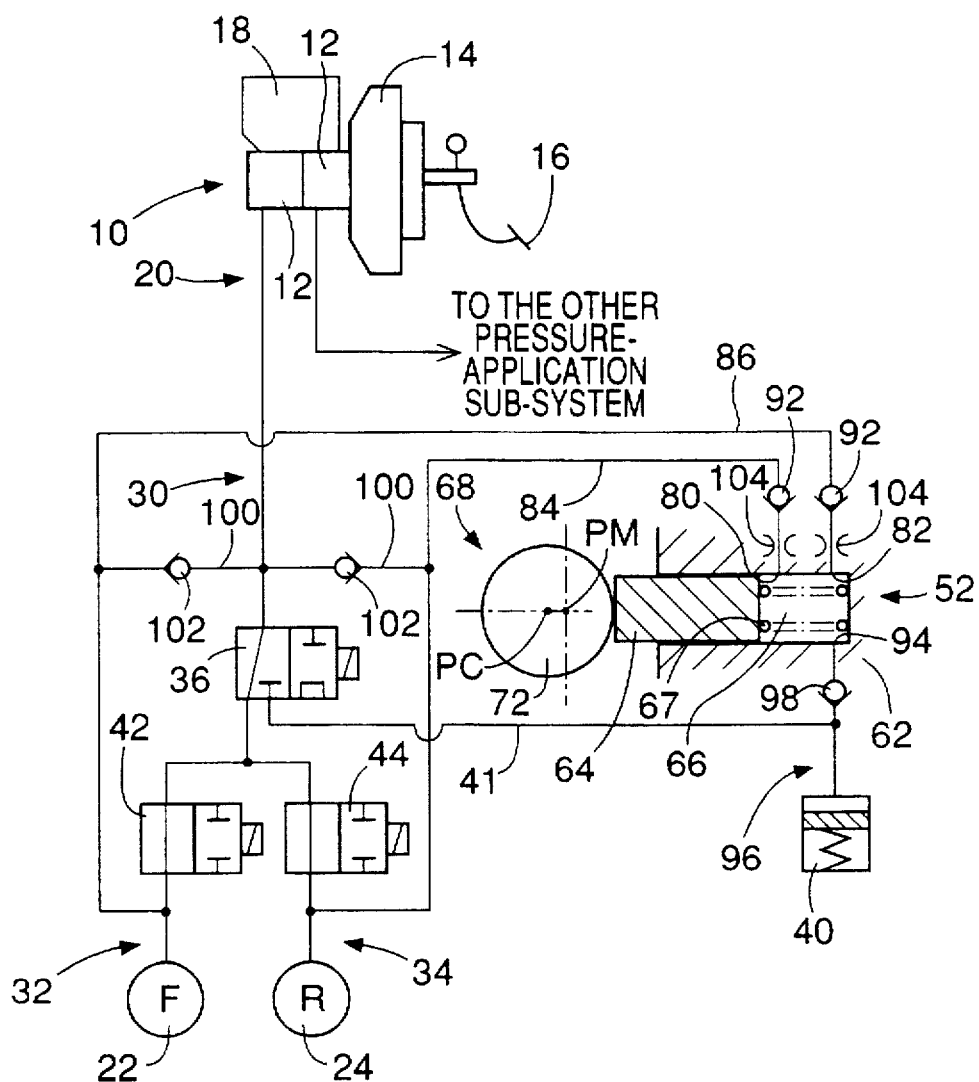
FIG. 1 is a schematic view illustrating a mechanical arrangement of a braking system constructed according to one embodiment of the present invention.

Referring first to FIG. 1 showing a braking system for a motor vehicle according to one embodiment of this invention, reference numeral 10 denotes a master cylinder of tandem type, which has two mutually independent pressurizing chamber 12 arranged in series. The master cylinder 10 is linked with a brake operating member in the form of a brake pedal 14 through a brake booster 14. Upon operation or depression of the brake pedal 16 by the operator of the motor vehicle, equal pressures of a working fluid (brake fluid) are mechanically generated in the two pressurizing chambers 12 of the master cylinder 10. The master cylinder 10 is provided with a reservoir 18 for filling the two pressurizing chambers 12.

One of the two pressurizing chambers 12 of the master cylinder 12 is connected to brake cylinders for a front left wheel and a rear right wheel of the vehicle, while the other pressurizing chamber 12 is connected to brake cylinders for a front right wheel and a rear left wheel of the vehicle. These brake cylinders are hereinafter referred to as "wheel brake cylinders". Thus, the braking system has two mutually independent pressure application sub-systems, one of which has the front left wheel brake cylinder and the rear right wheel brake cylinder, and the other of which has the front right wheel brake cylinder and the rear left wheel brake cylinder. Since the two pressure application sub-systems are identical in construction with each other, only one of these two sub-systems is illustrated in FIG. 1 and will be described in detail.

In each pressure application sub-system, the corresponding pressurizing chamber 12 of the master cylinder 10 is connected to the front wheel brake cylinder 22 and the rear wheel brake cylinder 24 through a primary fluid passage 20. The primary fluid passage 20 consists of a main line 30 extending from the pressurizing chamber 12, and two branch lines 32, 34 which branch from the main line 30 and which are connected to the front and rear wheel brake cylinders 22, 24.

A solenoid-operated direction control valve 36 is disposed in the main line 30. This directional control valve 36 is normally placed in a pressure-increase position for disconnection of the wheel brake cylinders 22, 24 from a reservoir 40 and for connection of these wheel brake cylinders 22, 24 to the master cylinder 10. When the solenoid coil of the directional control valve 36 is energized, the valve 36 is brought to a pressure-decrease position for disconnection of the wheel brake cylinders 22, 24 from the master cylinder 10 and for connection of the wheel brake cylinders 22, 24 to the reservoir 40 through a reservoir passage 41. In the branch lines 32, 34, there are disposed respective normally-open solenoid-operated shut-off valves 42, 44.

During a normal braking operation of the braking system, the master cylinder 10 is brought into communication with the front and rear wheel brake cylinders 22, 24 through the solenoid-operated directional control valve 36 and the solenoid-operated shut-off valves 42, 44. During an anti-lock pressure control operation of the braking system, the solenoid-operated directional control valve 36 is energized and placed in the pressure-decrease position, and the solenoid-operated shut-off valves 42, 44 are energized as needed, so that the working fluid is discharged from the wheel brake cylinder 22, 24 corresponding to the energized solenoid-operated shut-off valve 42, 44, to the reservoir 40 through the energized shut-off valve 42, 44 and directional control valve 36, whereby the pressure in the wheel brake cylinder 22, 24 is lowered as needed to avoid locking tendency of the corresponding wheel.

A pump 52 is connected through a pump passage to a portion of each branch line 32, 34 between the solenoid-operated shut-off valve 42, 44 and the corresponding wheel brake cylinder 22, 24.

Figure 2:
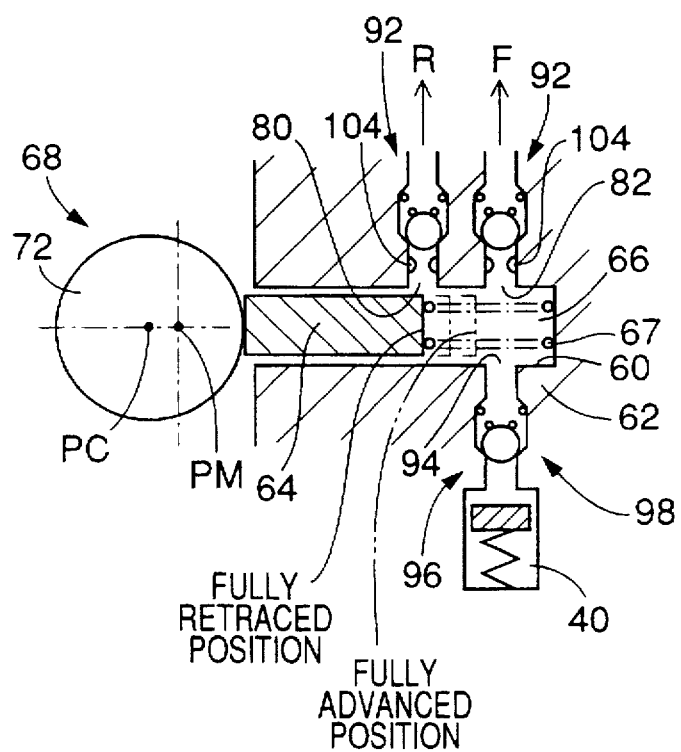
FIG. 2 is a cross sectional view of a pump used in the braking system of FIG. 1.

Referring to FIG. 2, the pump 52 has a housing 62 in which a cylinder bore 60 is formed such that the cylinder bore 60 is closed at one of its longitudinal ends. A piston 64 having a constant diameter is slidably movable received in this cylinder bore 60. The bottom surface of the cylinder bore 60 and the end face of the piston 64 which faces the above-indicated bottom surface cooperate to define a cylindrical space which serves as a pump chamber 66. Within this pump chamber 66, there is disposed a biasing member in the form of a spring 67 for biasing the piston 64 in such a direction as to increase the volume of the pump chamber 66. For reciprocating the piston 64 against the biasing force of the spring 67, the present braking system uses a reciprocating device in the form of a cam device 68. This cam device 68 includes a motor 70 (FIG. 5), and a cam 72 of eccentric type which is rotated by the motor 70. The spring 67 holds the piston 64 in contact with the circumferential surface of the cam 72, at the end face remote from the spring 67.

Described in detail, the cam 72 takes the form of a circular disk whose circumferential surface serves as a cam surface. The cam 72 has an axis of rotation which is offset from its centerline (centerline of the circumference), and is supported by a suitable housing so that the cam 72 is rotatable about this axis of rotation. The axis of rotation of the cam 72 is perpendicular to the axis or longitudinal direction of the piston 64. In FIG. 2, "PC" represents a center point of the cam 72, while "PM" represents a center point or axis of the motor 70, which is aligned with the axis of rotation of the cam 72. When the cam 72 is rotated about its axis by the motor 70, the piston 64 in contact with the cam surface is reciprocated to periodically change (alternately increase and decrease) the volume of the pump chamber 66.

Two delivery ports 80, 82 are open to the pump chamber 66, at positions that are spaced apart from each other in a direction of movement of the piston 64. As shown in FIG. 1, the delivery port 80 is connected through a pump passage 84 to the portion of the branch line 34 between the solenoid-operated shut-off valve 44 and the rear wheel brake cylinder 24. On the other hand, the delivery port 82 is connected through a pump passage 86 to the portion of the branch line 32 between the solenoid-operated shut-off valve 42 and the front wheel brake cylinder 22. A delivery valve 92 is disposed in each of the pump passages 84, 86. This delivery valve 92 functions as a check valve for permitting a flow of the working fluid therethrough in a direction from the pump chamber 66 toward the wheel brake cylinders 22, 24, and inhibiting a flow of the fluid in the reverse direction.

A suction port 94 is also open to the pump chamber 66, as shown in FIG. 2. The suction port 94 is connected through a pump passage 96 to a reservoir chamber of the above-indicated reservoir 40. The pump passage 96 is provided with a suction valve 98, which functions as a check valve for permitting a flow of the fluid therethrough in a direction from the reservoir 40 toward the pump chamber 66, and inhibiting a flow of the fluid in the reverse direction. As shown in FIG. 1, the reservoir passage 41 indicated above is connected to a portion of the pump passage 96 between the suction valve 98 and the reservoir 40.

In the present arrangement of the pump 52, a reciprocating movement of the piston 64 causes a periodic change of the volume of the pump chamber 66, which results in repeated alternate suction and delivery strokes of the pump 52. In the suction stroke, the working fluid sucked up from the reservoir 40 into the pump chamber 66. In the delivery stroke, the fluid in the pump chamber 66 is pressurized and delivered to the wheel brake cylinders 22, 24. By operation of this pump 52 during an anti-lock control operation of the present braking system, the pressures in the wheel brake cylinders 22, 24 are increased.

It is noted that the cam device 68 is used commonly for the two pressure application sub-systems in the present embodiment, for reducing the number of the components and weight of the pump 52. However, the cam device 68 may be provided for each of the two pressure application sub-systems.

A return passage 100 is provided for connecting each pump passage 84, 86 at a portion thereof between the delivery valve 92 and its end connected to the branch line 32, 34, to a portion of the main line 30 between the master cylinder 10 and the solenoid-operated directional control valve 36. Each return passage 100 is provided with a check valve 102 which permits a flow of the fluid therethrough in a direction from the pump passage 84, 86 toward the main line 30, and inhibits a flow of the fluid in the reverse direction. During a normal operation of the braking system, the return passages 100 facilitate the return flows of the fluid from the wheel brake cylinders 22, 24 back to the master cylinder 10. During the anti-lock control operation of the braking system, on the other hand, the return passages 100 function to permit relief flows of the pressurized fluid from the pump passages 84, 86, to thereby prevent a rise of the delivery pressure of the pump 52 (pressure in the pump chamber 66) above the pressure of the master cylinder 10.

Further, an orifice 104 is provided in a portion of each pump passage 84, 86 between the pump chamber 66 and a point of connection thereof to the return passage 100. This orifice 104 functions as a flow restrictor or throttle.

Figure 3:
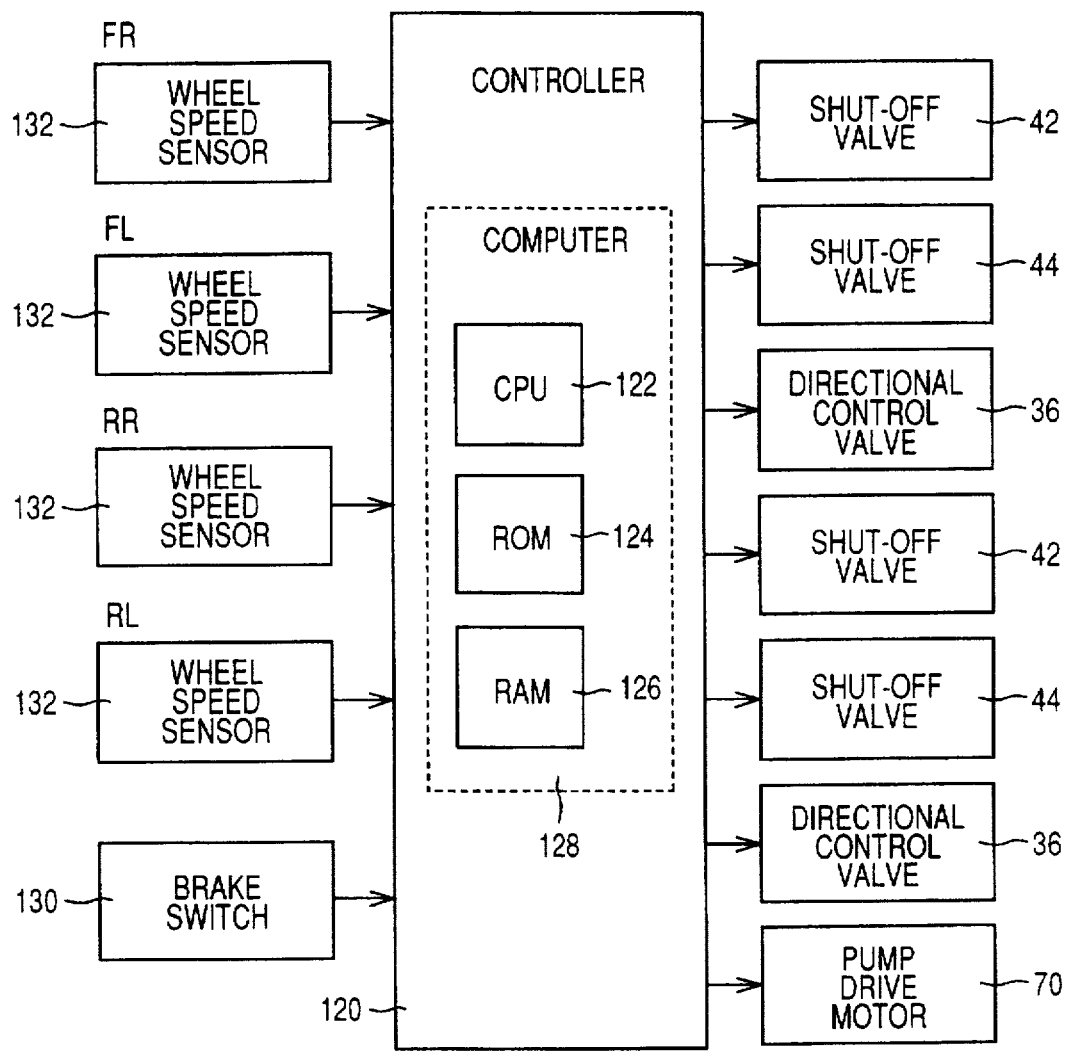
FIG. 3 is a block diagram schematically illustrating an electrical arrangement of the braking system of FIG. 1.

The solenoid-operated directional control valve 36 and the two solenoid-operated shut-off valves 42, 44 of each pressure application sub-system and the common motor 72 for each sub-system are controlled by a controller 120 indicated in FIG. 3. The controller 120 is constituted principally by a computer 128 which incorporates a central processing unit (CPU) 122, a read-only memory (ROM) 124 and a random-access memory (RAM) 126. The CPU 122 operates to execute an anti-lock pressure control routine according to a program stored in the ROM 124 while utilizing a temporary data storage function of the RAM 126. The anti-lock pressure control routine is formulated to determine whether each wheel of the vehicle has a locking tendency, and regulate the pressure in the brake cylinder 22, 24 for the locking wheel, so as to avoid or reduce the locking tendency. The determination of the wheel locking tendency is effected on the basis of various input signals such as an output signal of a brake switch 130 and output signals of wheel speed sensors 132. The brake switch 130 is provided to detect an operation of the brake pedal 16. The wheel speed sensors 132 are provided to detect the rotating speeds of the corresponding wheels, more specifically, the peripheral speeds of the wheels.

There will be described the anti-lock pressure control routine in detail.

When the front wheel has a locking tendency due to application of an abrupt brake to the vehicle, the solenoid-operated shut-off valve 42 for the front wheel brake cylinder 22 is energized and is consequently closed. As a result, the front wheel brake cylinder 22 is disconnected from the master cylinder 10, directional control valve 36 and reservoir 40, whereby the pressure in the front wheel brake cylinder 22 is maintained at the present level. If the locking tendency of the front wheel is not removed by disconnecting the front wheel brake cylinder 22 from the master cylinder 10 to maintain the pressure, the solenoid-operated directional control valve 36 is energized and is brought to its pressure-decrease position, while at the same time the shut-off valve 42 for the front wheel brake cylinder 22 is de-energized and is opened, and the shut-off valve 44 for the rear wheel brake cylinder 24 is energized and is closed. As a result, the front wheel brake cylinder 22 is connected to the reservoir 40 through the shut-off valve 42 and directional control valve 36, whereby the pressure in the front wheel brake cylinder 22 is lowered. Then, the motor 72 is turned on to start the pump 52, and the pressurized fluid delivered from the pump 52 is supplied to the wheel brake cylinders 22, 24, so that the pressures in the wheel brake cylinders 22, 24 are increased up to an upper limit which is equal to the pressure in the master cylinder 10.

In principle, once the solenoid-operated directional control valve 36 is switched to the pressure-decrease position, it is kept in the pressure-decrease position until the anti-lock pressure control operation is terminated. If it is necessary to increase the amount of the working fluid in a portion of the hydraulic circuit including the wheel brake cylinders 22, 24, reservoir 40 and pump 52, the directional control valve 36 is temporarily placed in its pressure-increase position to feed the fluid from the master cylinder 10 into the wheel brake cylinders 22, 24, etc.

During the anti-lock pressure control operation, the motor 70 is kept on, and the pump 52 is kept operated to deliver the pressurized fluid as long as any amount of the fluid is present in the reservoir 40. Therefore, while the pressure in the rear wheel brake cylinder 24 is increased by operation of the pump 52, the pressure in the front wheel brake cylinder 22 is maintained as long as the delivery pressure of the pump 52 is not higher than the pressure in the front wheel brake cylinder 22. After the delivery pressure of the pump 52 has exceeded the pressure in the front wheel brake cylinder 22, the pressure in this brake cylinder 22 as well as the pressure in the rear wheel brake cylinder 24 is increased by operation of the pump 52, that is, the pressures in the front and rear wheel brake cylinders 22, 24 are simultaneously increased. This mode of operation is referred to as "simultaneous front/rear pressure increase mode".

In the conventional braking system, the front and rear wheel brake cylinders are both communicated with the pump chamber when the pressures in these two brake cylinders are simultaneously increased. In the conventional braking system, therefore, when there exists a difference between the pressures in the two wheel brake cylinders in the same pressure application sub-system during running of the vehicle on an uneven-friction-coefficient road surface, it is not possible to increase the pressure in the "higher-pressure brake cylinder" at a sufficiently high rate, because the difference between the pressure in the higher-pressure brake cylinder and the delivery pressure of the pump is controlled to be smaller than a difference between the pressure in the "lower-pressure brake cylinder" and the delivery pressure of the pump. As explained above, the higher-pressure brake cylinder is one of the two wheel brake cylinders of the same pressure application sub-system which has a higher pressure than the other wheel brake cylinder, and the lower-pressure brake cylinder is the other wheel brake cylinder.

In the present braking system, on the other hand, the two delivery ports 80, 82 corresponding to the rear and front wheel brake cylinders 24, 22 are disposed so as to be open to the pump chamber 66 at the respective positions which are spaced apart from each other in the direction of movement of the piston 64 of the pump 52. When the piston 64 is placed at its fully retracted position (lower dead point) as indicated by solid line in FIG. 2, the two delivery ports 80, 82 are both open. When the piston 64 is advanced by a small distance to an intermediate position indicated by a left one of two two-dot chain lines in FIG. 2, only the delivery port 80 corresponding to the rear wheel brake cylinder 24 is closed by the front end portion of the piston 64, which functions as a valve spool. The delivery port 80 is held closed by the piston 64 while the piston 64 is further advanced to its fully advanced position (upper dead point) indicated by the right two-dot chain line in FIG. 2. However, the delivery port 82 corresponding to the front wheel brake cylinder 22 is held open over the entire delivery stroke of the piston 64. Thus, in an initial portion of the delivery stroke of the piston 64, the two delivery ports 80, 82 are both or simultaneously open, and the pressurized fluid delivered from the pump 52 is less likely to be fed to the higher-pressure brake cylinder of the two wheel brake cylinders 22, 24, when the braking system is placed in the simultaneous front/rear pressure increase mode. In the remaining portion half of the delivery stroke of the piston 64 in which only the delivery port 82 is open, the pressurized fluid delivered from the pump 52 is fed to only the front wheel brake cylinder 22 without being influenced by the pressure in the rear wheel brake cylinder 24, whereby the pressure in the front wheel brake cylinder 22 is increased at a comparatively high rate.

In this respect, it is noted that the higher-pressure brake cylinder is not always fixed. In other words, either one of the two wheel brake cylinders 22, 24 may be the higher-pressure brake cylinder. Therefore, it is ideal to determine which one of the two wheel brake cylinders 22, 24 is the higher-pressure brake cylinder, and connect the permanently open delivery port 82 (on the side of the fully advanced position of the piston 64) to the determined higher-pressure brake cylinder 22, 24. In the present first embodiment, the permanently open delivery port 82 is kept in communication with the front wheel brake cylinder 22, in view of a fact in the diagonal or X-crossing braking system that a larger braking effect can be obtained by increasing the rate of increase of the pressure in the front wheel brake cylinder 22, since a larger load acts on the front wheel by a load shift due to an initial braking effect in each pressure application sub-system.

The anti-lock pressure control routine indicated above is adapted to control the pressures of the rear wheel brake cylinders in the two pressure application sub-systems in the "select-low control" fashion during an anti-lock pressure control operation of the braking system. The select-low control is effected with a relatively high possibility, upon abrupt brake application during running of the vehicle on an uneven-friction-coefficient road surface, in particular. In the select-low control, the pressure of the higher-µ rear wheel brake cylinder in one of the two sub-systems is controlled in the same manner as the pressure of the lower-µ rear wheel brake cylinder in the other sub-system. As previously explained, the higher-µ rear wheel brake cylinder corresponds to the rear wheel lying on the higher-µ road surface area (one of the right and left areas of the uneven-friction-coefficient road surface which has a higher friction coefficient), while the lower-µ rear wheel brake cylinder corresponds to the other rear wheel lying on the lower-µ road surface area (the other road surface area having a lower friction coefficient).

For example, the pressure of the lower-µ rear wheel brake cylinder is controlled according to the anti-lock pressure control routine, such that an appropriate one of a plurality of pressure control modes including a pressure-decrease mode and a pressure-increase mode is selected on the basis of detected physical values indicative of the locking tendency of the corresponding rear wheel, such as the rotating speed or acceleration (deceleration) value of that rear wheel. The pressure of the higher-µ rear wheel brake cylinder is controlled in the pressure control mode selected for the lower-µ rear wheel brake cylinder. Thus, the pressure control mode for the higher-µ rear wheel brake cylinder is selected or determined irrespective of the locking tendency of the corresponding rear wheel lying on the higher-µ road surface area.

Figures 4, 5:
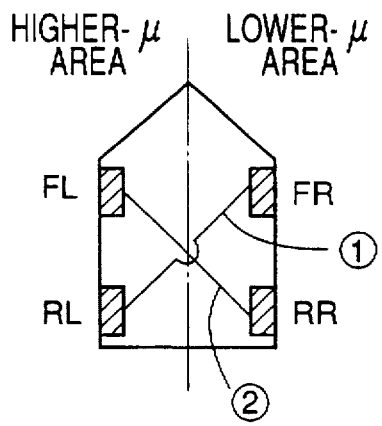
FIG. 4 is a plan view showing one example of a road surface on which a motor vehicle runs and the left and right areas of which have different coefficients of friction.
FIG. 5 is a view indicating ratios of amounts of brake fluid delivery to front and rear wheel brake cylinders of the vehicle in the braking system of FIG. 1, as compared with those in a comparative braking system.

Regarding the select-low control of the pressures of the two rear wheel brake cylinders, there will be described an advantage of the present braking system over the conventional system, taking a specific example wherein the braking system is placed in the simultaneous front/rear pressure-increase mode during an anti-lock pressure control operation (which includes a pressure control operation in the select-low control fashion), while the motor vehicle is running on an uneven-friction-coefficient road surface whose right and left areas have relatively low and high friction coefficients, respectively, as indicated in FIG. 4.

In the example of FIG. 4, the braking system consists of a first pressure application sub-system including the brake cylinder 22 for the front right wheel FR and the brake cylinder 24 for the rear left wheel RL, and a second pressure application sub-system including the brake cylinder 22 for the front left wheel FL and the brake cylinder 24 for the rear right wheel RR. The first and second sub-systems are indicated at (1) and (2), respectively, in FIG. 4.

Referring to a table of FIG. 5, there is indicated a µ-difference influence coefficient $\alpha$. The concept of this coefficient $\alpha$ is based on an assumption that during running of the vehicle on an even-friction-coefficient road surface whose friction coefficient is substantially uniform over the entire width (in the lateral direction of the vehicle), the amount of delivery of the fluid from the pump 52 to the front wheel brake cylinder 22 is equal to that to the rear wheel brake cylinder 24. According to this assumption, a front distribution ratio $\gamma F$ of the delivery amount to the front wheel brake cylinder 22 to the entire delivery amount of the pump 52 is equal to 0.5, and a rear distribution ratio $\gamma R$ of the delivery amount to the rear wheel brake cylinder 24 to the entire delivery amount is also equal to 0.5, when the vehicle is running on the even-frictioncoefficient road surface. During running of the vehicle on the uneven-friction-coefficient road surface, the delivery amounts to the brake cylinders corresponding to the higher-µ and lower-µ road surface areas (higher-µ and lower-µ brake cylinders) decrease and increase, respectively, with an increase in the difference between the friction coefficients of the right and left areas of the road surface. The µ-difference influence coefficient a is therefore determined so as to satisfy the following equations.

In the first pressure application sub-system in which the front wheel brake cylinder is the lower-µ brake cylinder, the following equations are satisfied:

$$\gamma F=0.5+\alpha$$

$$\gamma R=0.5-\alpha$$

In the second pressure application sub-system in which the front wheel brake cylinder is the higher-µ brake cylinder, the following equations are satisfied:

$$\gamma F=0.5-\alpha$$

$$\gamma R=0.5+\alpha$$

According to the above equations, the µ-difference is equal to 0.5 when the delivery amount of the pump 52 to the rear wheel brake cylinder 24 is equal to 0 in the first sub-system in which the front wheel brake cylinder 22 is the lower-µ brake cylinder, and when the delivery amount to the front wheel brake cylinder 22 is equal to 0 in the second sub-system in which the front wheel brake cylinder 22 is the higher-p brake cylinder.

It is also assumed here that the two delivery ports 80, 82 are both open in a two-thirds (⅔) portion of each delivery stroke of the pump 52 (piston 64), while only the delivery port 82 is open in the remaining one-third (⅓) portion of the delivery stroke.

In the comparative or conventional braking system, the two brake cylinders 22, 24 in the same pressure application sub-system are connected to the same pump chamber 66 through a single delivery port.

In the conventional braking system, the front distribution ratio $\gamma F$ and the rear distribution ratio $\gamma R$ are 1:1 in each of the two sub-systems, when the µ-difference influence coefficient a is 0. When the µ-difference influence coefficient a is 0.5, the pressurized fluid delivered from the pump 52 is not supplied to the front wheel brake cylinder 22 in the second sub-system in which the rear wheel brake cylinder 24 is the lower-µ brake cylinder. In this case, the front and rear distribution ratios $\gamma F$ and $\gamma R$ are 0:1 in the second sub-system. In the first sub-system in which the rear wheel brake cylinder 24 is the higher-μ brake cylinder, the control of the wheel brake cylinder pressures is adversely influenced by the select-low control when the μ-difference influence coefficient a is 0.5. Namely, the pressures in the front and rear wheel brake cylinders 22, 24 are controlled to be substantially equal to each other, and the front and rear distribution ratios γF and γR are 1:1 in the first sub-system, although the left and right road surface areas on which the front and rear wheels lie have different friction coefficient values.

In the present braking system, when the μ-difference influence coefficient α is 0, the pressures in the front and rear wheel brake cylinders 22, 24 in each sub-system are controlled to be substantially equal to each other, and the front and rear distribution ratios γF and γR are 1:1, while the two delivery ports 80, 82 are both open. However, the two delivery ports 80, 82 are both open in only the ⅔ portion of the delivery stroke of the pump 52, and only the deliver port 82 communicating with the front wheel brake cylinder 22 is open in the remaining ⅓ portion of the delivery stroke. Therefore, each of the overall front and rear distribution ratios γF and γR during the entire period of the delivery stroke of the pump 52 is obtained to be approximately equal to the sum of a first ratio during the ⅔ portion of the delivery stroke and a second ratio during the ⅓ portion of the delivery stroke. The first ratio is equal to the distribution ratio while the two delivery ports 80, 82 are open, multiplied by ⅔, and the second ratio is equal to the distribution ratio while the delivery port 82 is alone open, multiplied by ⅓. Therefore, the overall front and rear distribution ratios γF and γR during the entire period of the delivery stroke of the pump 52 are calculated as follows:

$$\gamma F = 0.5 \times \frac{2}{3} + 1 \times \frac{1}{3} = \frac{2}{3}$$

$$\gamma R = 0.5 \times \frac{2}{3} + 0 \times \frac{1}{3} = \frac{1}{3}$$

Therefore, γF:γR=2:1.

When the μ-difference influence coefficient α is 0.5, the pressure in the front wheel brake cylinder 22 in the second sub-system is higher than that in the rear wheel brake cylinder 24 in the second sub-system, the pressurized fluid delivered from the pump 52 is supplied to only the lower-pressure rear wheel brake cylinder 24 while the two delivery ports 80, 82 are both open. When only the delivery port 82 is open in the second sub-system, the pressurized fluid is supplied from the pump 52 to only the front wheel brake cylinder 22 connected to the pump chamber 66 through the open delivery port 82, even though the pressure in the front wheel brake cylinder 22 is higher than that in the rear wheel brake cylinder 24. In this case, the overall front and rear distribution ratios γF and γR are calculated as follows:

$$\gamma F = 0 \times \frac{2}{3} + 1 \times \frac{1}{3} = \frac{1}{3}$$

$$\gamma R = 1 \times \frac{2}{3} + 0 \times \frac{1}{3} = \frac{2}{3}$$

Therefore, γF:γR=1:2.

In the first sub-system in which the rear wheel brake cylinder 24 is the higher-μ brake cylinder, the pressures of the front and rear wheel brake cylinders 22, 24 are influenced by the select-low control. Namely, these pressures are controlled to be substantially equal to each other, and the overall front and rear distribution ratios γF and γR are 1:1, even though the left and right road surfaces areas on which the front and rear wheels lie have different friction coefficient values.

It will be understood from the above explanation of the present embodiment that the pressure in the front wheel brake cylinder 22 in the second sub-system in which the front wheel brake cylinder 22 is the higher-μ brake cylinder can be increased by operation of the pump 52 even where the μ-difference influence coefficient α is 0.5. Accordingly, the braking effect provided by the present braking system as a whole is improved as compared with that of the conventional braking system.

There will be described functions of the orifices 104.

The pump 52 delivers the pressurized fluid in an intermittent manner, and therefore the delivery pressure of the pump 52 suffers from some pulsation or variation. The orifices 104 function to reduce this pulsation before the delivered fluid is fed to the wheel brake cylinders 22, 24.

The orifices 104 also function to increase the rate of increase of the pressure in the front wheel brake cylinder 22 in the sub-system in which the front wheel brake cylinder 22 is the higher-μ brake cylinder. This function of the orifices 104 will be described in detail.

When the two wheel brake cylinders 22, 24 are both communicated with the pump chamber 66 through the respective delivery ports 82, 80, the fluid delivered from the pump chamber 66 is less likely to be fed to the higher-pressure brake cylinder, as described above. The amount of delivery to each wheel brake cylinder 22, 24 depends upon the difference between the pressure in the brake cylinder and the delivery pressure of the pump 52. Accordingly, when the two wheel brake cylinders 22, 24 are both communicated with the pump chamber 66, the amount of flow of the fluid toward the higher-pressure brake cylinder is smaller, and the rate of increase of the pressure in the higher-pressure brake cylinder is comparatively low. In the present embodiment wherein the pump chamber 66 communicates with the wheel brake cylinders 22, 24 through the respective orifices 104, the amount of flow of the fluid from the pump chamber 66 toward each wheel brake cylinder 22, 24 depends upon a square root of the difference between the pressure in the wheel brake cylinder and the delivery pressure of the pump 52. Therefore, when the two delivery ports 80, 82 are open for communication of the pump chamber 66 to the two wheel brake cylinders 22, 24, the difference between the amounts of flow of the fluid to the two wheel brake cylinders 22, 24 is reduced. This function of the orifices 104 can be improved by reducing the effective diameter of the orifices 104 to maximize the delivery pressure of the pump 52.

In the present embodiment, the pump chamber 66 is communicated with only the front wheel brake cylinder 22 in the terminal ⅓ portion of the delivery stroke of the pump 52. This arrangement is effective to minimize a decrease in the rate of increase of the pressure in the front wheel brake cylinder 22 where this brake cylinder 22 is the higher-μ brake cylinder, even in the presence of the rear wheel brake cylinder 24. In the initial ⅔ portion of the delivery stroke wherein the pump chamber 66 communicates with the two brake cylinders 22, 24, the orifices 104 provided in the respective pump passages 84, 86 function to minimize the decrease in the rate of increase of the pressure in the front wheel brake cylinder 22.

In this respect, it is noted that the provision of orifices in pump passages connecting brake cylinders and a pump chamber is a known technique employed in the prior art braking system. In this prior art, however, the pump chamber simultaneously communicates with the two wheel brake cylinders over the entire delivery stroke of the pump. To reduce the decrease in the rate of increase of the pressure of the higher-pressure brake cylinder, the effective diameter of the orifices should be made as small as possible in the prior art. That is, the effective diameter should be minimized to maximize the back pressure of the orifice, namely, the pressure on one side of the orifice which is nearer to the delivery port. The reduction of the effective diameter of the orifices undesirably leads to high possibility of plugging of the orifices with foreign matters, or requires the use of a filter to remove the foreign matters to avoid the plugging of the orifices, or the use of a large-sized pump drive motor to increase the delivery pressure of the pump.

In the present braking system in which the pump chamber 66 simultaneously communicates with the two brake cylinders 22, 24 during only the initial ⅔ portion of the delivery stroke of the pump 52, it is not necessary to reduce the effective diameter of the orifices 104 to such an extent as required in the prior art. Consequently, the present braking system does not require an exclusive filter to remove the foreign matters or a large-sized pump drive motor, leading to an accordingly reduced cost of manufacture of the braking system, which is a unique advantage of the present embodiment.

Figure 6:
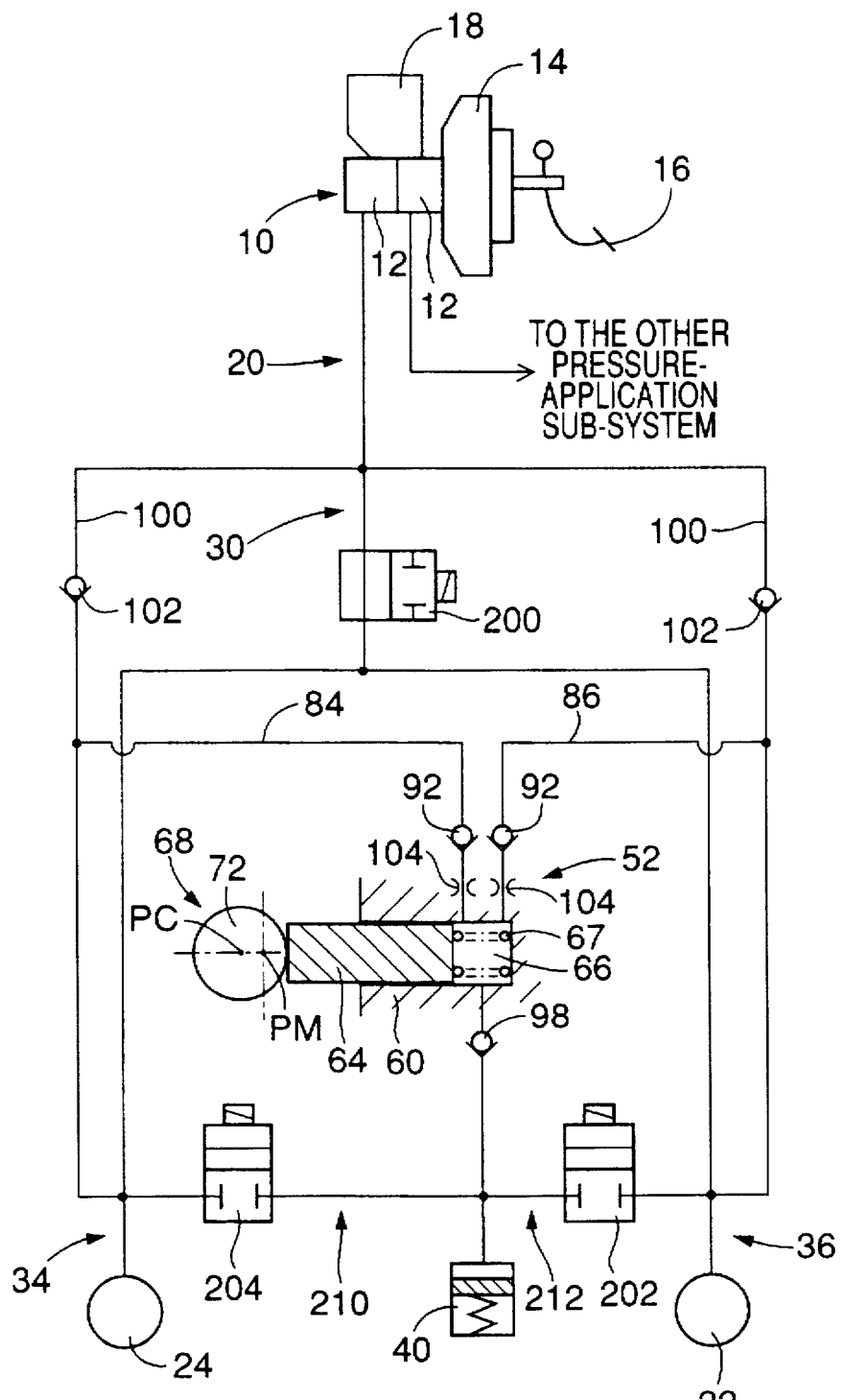
FIG. 6 is a schematic view illustrating a mechanical arrangement of a braking system according to another embodiment of this invention.

Referring to FIG. 6, there will be described a second embodiment of this invention. In FIG. 6, the same reference numerals as used in FIGS. 1 and 3 will be used to identify the functionally corresponding elements.

In the present second embodiment, a normally-open solenoid-operated shut-off valve 200, a normally-closed solenoid-operated shut-off valve 202 and a normally-closed shutOoff valve 204 are used in place of the solenoid-operated directional control valve 36, normally-open solenoid-operated shut-off valve 42 and normally-open solenoid-operated shutoff valve 44 which are used in the first embodiment. The shut-off valves 42 and 44 in the first embodiment function as pressure-raising valves whose solenoids are energized to increase the pressures in the front and rear wheel brake cylinders 22, 24, respectively. On the other hand, the shut-off valves 202 and 204 provided in the second embodiment function as pressure-reducing valves whose solenoids are energized to reduce the pressures in the front and rear wheel brake cylinders 22, 24. Further, the second embodiment includes reservoir passages 210, 212 extending from the branch lines 32, 34 and connected to the reservoir 40. The shut-off valves 202, 204 are disposed in these reservoir passages 210, 212, respectively.

During a normal braking operation of the present braking system, the fluid pressurized by the master cylinder 10 is fed to the front and rear wheel brake cylinders 22, 24 through the main line 30, normally-open solenoid-operated shut-off valve 200 and two branch lines 32, 34.

In an anti-lock pressure control operation of the braking system, the shut-off valve 200 is first energized and closed, and the shut-off valves 202, 204 are energized and opened as needed, so that the fluid in the brake cylinder or cylinders 22, 24 corresponding to the opened shut-off valves 202, 204 is discharged to the reservoir 40 through part of the corresponding branch line 32, 34 and the corresponding reservoir passage 210, 212, whereby the pressure in the corresponding brake cylinder 22, 24 is reduced. When it becomes necessary to increase the pressure in the brake cylinder 22, 24 as a result of reduction or removal of the locking tendency of the corresponding wheel, the shut-off valves 202, 204 are de-energized and closed as needed. At this time, the pump 52 has been turned on, and the pressurized fluid delivered from the pump chamber 66 is fed to the brake cylinder or cylinders 22, 24 corresponding to the opened shut-off valve or valves 202, 204, through the pump passage or passages 84, 86 and branch line or lines 32, 34. Consequently, the pressures in the brake cylinders 22, 24 are increased as needed.

The present second embodiment wherein the pump 52 has the same construction as in the first embodiment is also capable of increasing the pressure in the front wheel brake cylinder 22 at a rate high enough to achieve a sufficient braking effect, even where this brake cylinder 22 is the higher-μ brake cylinder.

Figure 7:
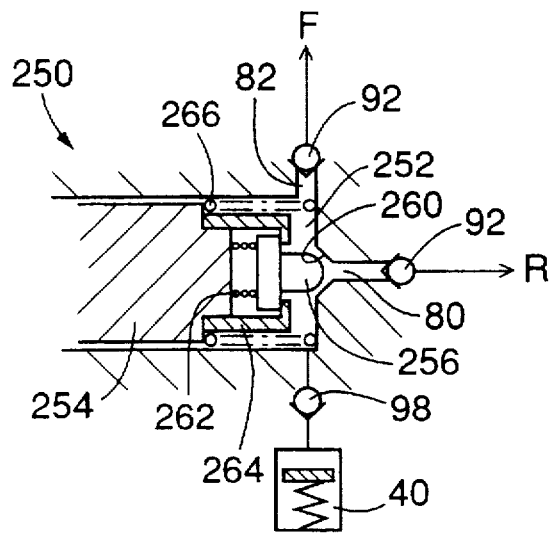
FIG. 7 is a fragmentary view of a mechanical arrangement of a braking system according to a further embodiment of the invention.

Referring further to FIG. 7, there will be described a third embodiment of the invention, which is different from the first embodiment of FIG. 1, only in the construction of the pump.

A pump used in this third embodiment, which is indicated generally at 250 in FIG. 7, uses not only a piston 254 adapted to change the volume of a pump chamber 252, but also a valve member 256 which is adapted to be seated on a valve seat 260. The two delivery ports 80, 82 are open to the pump chamber 252. The delivery port 80 connected to the rear wheel brake cylinder 24 is open to the pump chamber 252 through the valve seat 260. That is, the opening of the delivery port 80 at which the port 80 is open to the pump chamber 252 is defined by the valve seat 260, so that the valve seat 260 cooperates with the valve member 256 to constitute a valve mechanism for closing the delivery port 80. Between the valve member 256 and the piston 254, there is disposed a spring 262 which biases the valve member 256 in a direction toward the valve seat 260. A stop 264 is fixed to the piston 254 so that a maximum distance between the valve member 256 from the piston 254 is defined by the stop 264. In FIG. 7, reference numeral 266 designates a spring which biases the piston 254 toward its fully retracted position at which the pump chamber 252 has the largest volume.

When the piston 254 is placed in the fully retracted position (lower dead point) of FIG. 7, the valve member 256 is spaced away from the valve seat 260, and the delivery port 80 communicating with the rear wheel brake cylinder 24 is kept open. The delivery port 82 communicating with the front wheel brake cylinder 22 is not closed by the valve mechanism 256, 260 or the piston 254. Thus, when the piston 254 is in the fully retracted position, the two delivery ports 80, 82 are both open to the pump chamber 252. The valve member 256 is seated on the valve seat 260 shortly before the piston 254 has been moved to its fully advanced position (upper dead point). The valve member 256 is kept seated on the valve seat 260 to hold the delivery port 80 closed, and only the delivery port 82 is kept open, until the piston 254 is moved to the fully advanced position. For the same reason as described with respect to the first embodiment, the pressure in the front wheel brake cylinder 22 can be increased at a sufficiently high rate, even when the front wheel brake cylinder 22 is the higher-μ brake cylinder.

A fourth embodiment of this invention will be explained by reference to FIG. 8. This fourth embodiment is different from the first embodiment, only in the construction of the pump, and uses a valve mechanism as provided in the pump 250 of FIG. 7.

Figure 8:
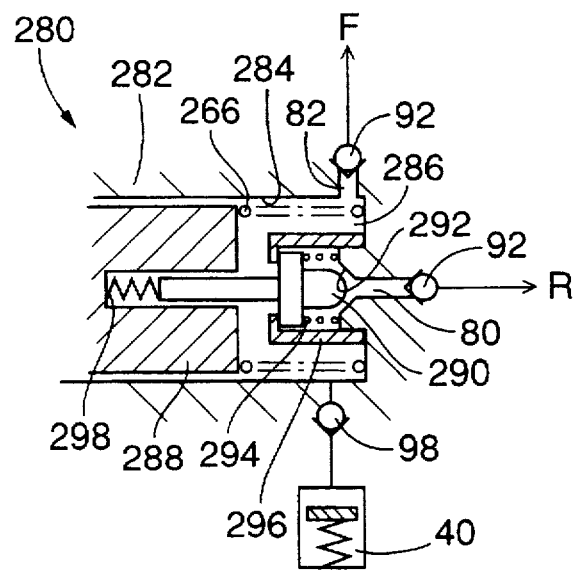
FIG. 8 is a fragmentary view of a mechanical arrangement of a braking system according to a still further embodiment of the invention.

The braking system of the fourth embodiment of FIG. 8 uses a pump 280 having a housing 282. The housing 282 has a cylinder bore 284 which is closed at one end thereof. Within this cylinder bore 284, there is slidably movably received a piston 288 which is adapted to be reciprocated so as to change the volume of a pump chamber 286. The pump 280 includes a valve member 290 in addition to the piston 288. The opening of the delivery port 80 corresponding to the rear wheel brake cylinder 24 is defined by a valve seat 2292, so that the valve member 290 and the valve seat 292 cooperate to constitute a valve mechanism for closing the delivery port 80. Between the valve member 290 and the valve seat 292, there is disposed a spring 294 which biases the valve member 290 in a direction away from the valve seat 292. A stop 296 is fixed to the housing 282 so that a maximum distance between the valve member 290 from the valve seat 292 is defined by the stop 296.

Between the valve member 290 and the piston 288, there is disposed a spring 298, which biases the valve member 290 in a direction toward the valve seat 292. The specifications of the pump 280 are determined so that the biasing force produced by the spring 298 is smaller than the biasing force produced by the spring 294 when the piston 288 is placed in its fully retracted position of FIG. 8. Thus, the valve member 290 is held away from the valve seat 292 in the fully retracted position of the piston 288. When the piston 288 is moved from its fully retracted position of FIG. 8 toward the fully advanced position, the distance between the piston 288 and the valve member 290 is reduced, whereby the spring 298 is compressed. As a result, the biasing force produced by the spring 298 exceeds the biasing force of the spring 294, and the valve member 290 is seated on the valve seat 292.

When the piston 288 is placed in the fully retracted position of FIG. 8, the valve member 290 is not seated on the valve seat 292 in the presence of the spring 294, and the the delivery port 80 communicating with the rear wheel brake cylinder 24 is kept open. The delivery port 82 communicating with the front wheel brake cylinder 22 is not closed by the valve mechanism 290, 292 or the piston 288. Thus, when the piston 254 is in the fully retracted position, the two delivery ports 80, 82 are both open to the pump chamber. When the piston 288 has been moved from the fully retracted position to a predetermined position before it has reached the fully advanced position, the valve member 290 is seated on the seat 292 under the biasing action of the spring 298. The valve member 290 is kept seated on the valve seat 292 to hold the delivery port 80 closed, and only the delivery port 82 is kept open, until the piston 288 is moved to the fully advanced position. For the same reason as described with respect to the first embodiment, the pressure in the front wheel brake cylinder 22 can be increased at a sufficiently high rate, even when the front wheel brake cylinder 22 is the higher-μ brake cylinder for the wheel lying on the higher-μ road surface area.

Figure 9:
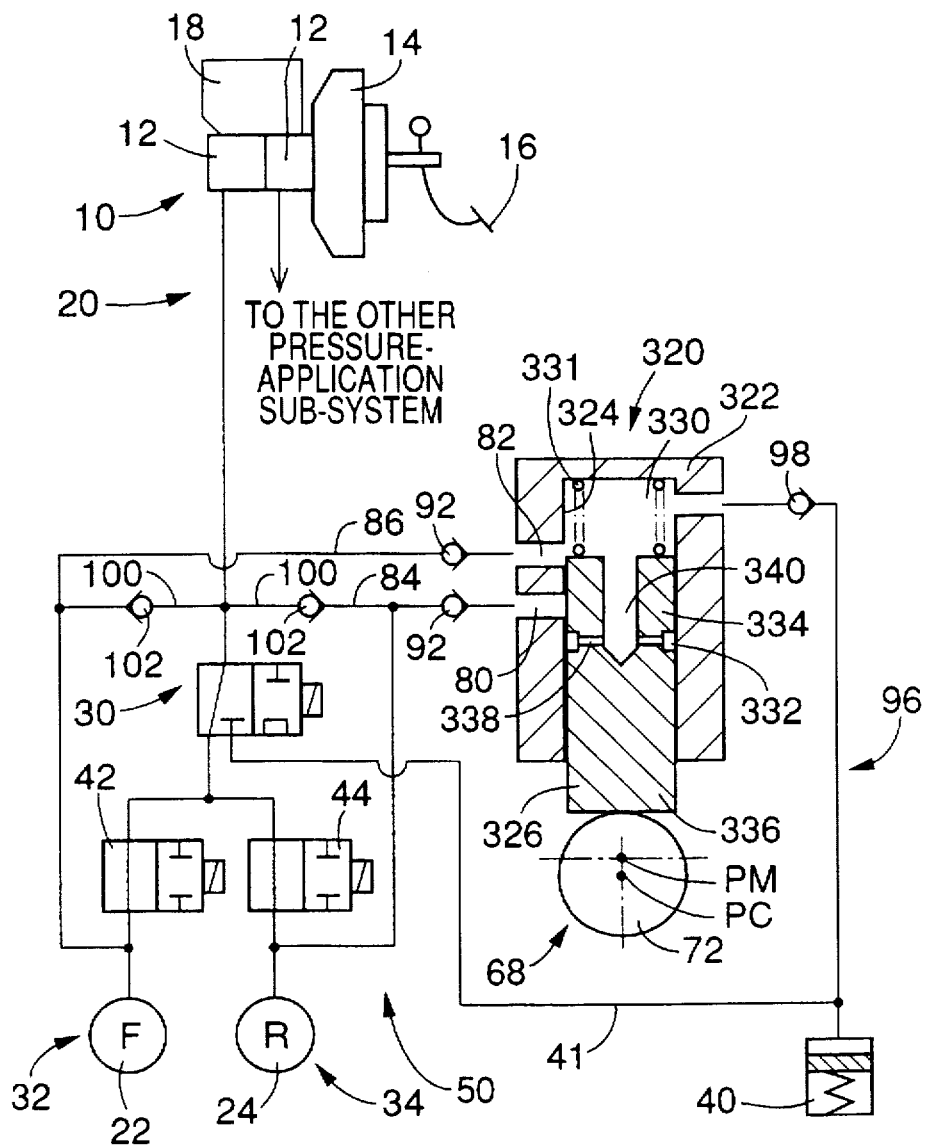
FIG. 9 is schematic view illustrating a mechanical arrangement of a braking system according to a yet further embodiment of this invention.
Figure 10:
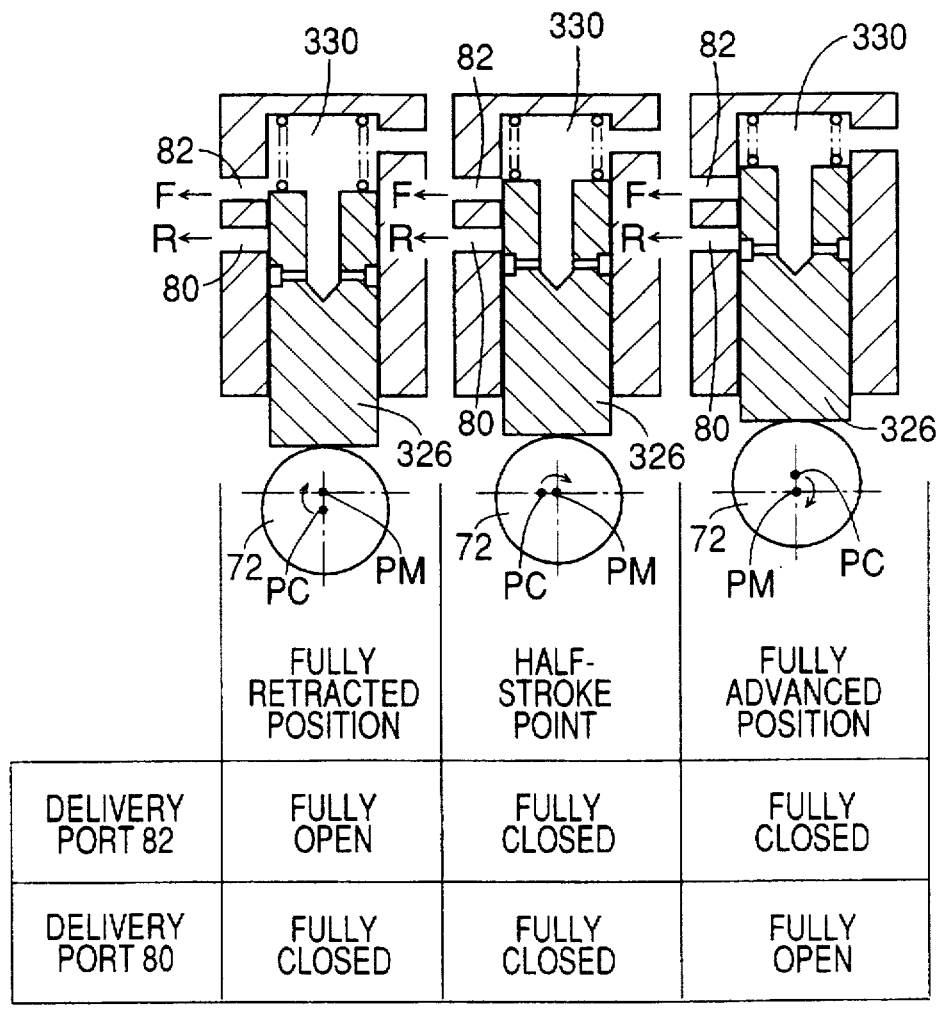
FIG. 10 is a view for explaining an operation of a pump used in the braking system of FIG. 9, in relation to different positions of a piston of the pump.

Referring next to FIGS. 9 and 10, there will be described a fourth embodiment of the present invention, which is different from the first embodiment of FIG. 1, only in the construction of a pump.

A pump 320 used in the fourth embodiment has a cylinder bore 324 formed in a housing 322 such that the cylinder bore 324 is closed at one end thereof, as shown in FIG. 9. A piston 326 is slidably movably received in the cylinder bore 324. A pump chamber 330 is defined between the bottom surface of the cylinder bore 324 and one end portion of the piston 326 on the side of the bottom surface. The piston 326 is reciprocated by the cam device 68 including the cam 72 as used in the first embodiment, so that the volume of the pump chamber 330 is changed. The pump 320 is provided with the two delivery ports 80, 82, two delivery valves 92 and one suction valve 98, which have been described above with respect to the first embodiment. A spring 331 is disposed as a biasing member in the pump chamber 330.

As in the first embodiment of FIG. 1, the two delivery ports 80, 82 are open to the pump chamber 330 at respective positions which are spaced apart from each other in the direction of movement of the piston 326. Unlike the piston 64 used in the first embodiment, the piston 326 has an annular groove 332 formed in the outer circumferential surface at a longitudinally intermediate portion thereof, and consists of a front end portion 334 and a rear end portion 336 on the axially opposite sides of the annular groove 332. The piston 326 further has a radial communication passage 338 communicating with the annular groove 332, and an axial communication passage 340 which communicates at one end thereof with the annular groove 332 and at the other end with the pump chamber 330. Thus, the annular groove 332 communicates with the pump chamber 330 through the radial and axial communication passages 338, 340.

An operation of the pump 320 will be described by reference to FIG. 10.

When the piston 326 is placed in its fully retracted position (lower stroke end) as indicated at the left-hand side position of FIG. 10, the delivery port 80 corresponding to the front wheel brake cylinder 22 is closed by the front end portion 334 of the piston 326, while the delivery port 82 corresponding to the rear wheel brake cylinder 24 is open. In this position, therefore, the pump chamber 330 is disconnected from the rear wheel brake cylinder 24 and can be communicated with the front wheel brake cylinder 22. If the solenoid-operated shut-off valve 42 is opened at this time, the fluid pressurized in the pump chamber 330 is supplied to only the front wheel brake cylinder 22, so that the pressure in this front wheel brake cylinder 22 is increased, independently of the pressure difference between the front and rear wheel brake cylinders 22, 24.

As the piston 326 is moved from the fully retracted position toward the fully advanced position, the area of communication of the delivery port 80 with the pump chamber 330 is gradually reduced while the delivery port 80 is kept closed. When the piston 326 has reached a half-stroke position between the fully retracted and advanced positions, as indicated at the center position of FIG. 10, the delivery port 82 is fully closed by the front end portion 334 of the piston 326. As the piston 326 is further moved from the half-stroke position toward the fully advanced position, the area of communication of the delivery port 80 with the pump chamber 330 is gradually increased while the delivery port 82 is kept closed. The communication of the delivery port 80 with the pump chamber 330 at this time is effected through the annular groove 332 and radial and axial communication passages 338, 340.

When the piston 326 has reached the fully advanced position indicated at the right-hand side position of FIG. 10, the delivery port 80 corresponding to the rear wheel brake cylinder 24 is fully opened while the delivery port 82 corresponding to the front wheel brake cylinder 22 is fully closed by the piston 326. As a result, the pump chamber 330 is disconnected from the front wheel brake cylinder 22 and is communicated with the rear wheel brake cylinder 24. If the shut-off valve 44 is opened, the fluid pressurized in the pump chamber 330 is supplied to only the rear wheel brake cylinder 24, so that the pressure in the rear wheel brake cylinder 24 is increased independently of the pressure difference between the front and rear wheel brake cylinders 22, 24.

In the present fourth embodiment, only the delivery port 82 corresponding to the front wheel is opened in the initial or first half of the delivery stroke of the pump 320, and only the delivery port 80 corresponding to the rear wheel is opened in the second half of the delivery stroke. Thus, the two delivery ports 80, 82 are not simultaneously operated at any time in the delivery stroke of the pump 320. In other words, the pump chamber 330 is communicated with the front and rear wheel brake cylinders 22, 24 during respective time periods, respectively. Therefore, the rate of increase of the pressure in the front wheel brake cylinder 22 is more effectively protected from an influence of the pressure in the rear wheel brake cylinder 24, even where the front wheel brake cylinder 22 is the higher-μ brake cylinder for the wheel lying on the higher-μ road surface area. Accordingly, the pressure in the higher-μ brake cylinder can be more effectively increased at a sufficiently high rate.

Further, the present embodiment of FIGS. 9 and 10 wherein the two delivery ports 80, 82 are not simultaneously open at any time in the delivery stroke of the pump 320 does not require orifices to be disposed in the pump passages 84, 86. Even if the orifices are provided, the orifices need not have a considerably small effective diameter.

The braking system of FIGS. 9–10 has a further advantage as described below.

In the present braking system, too, the controller 120 effects the select-low control of the pressures in the right and left rear wheel brake cylinders during an anti-lock pressure control operation, as described above with respect to the first embodiment. In the select-low control, the braking force of the rear wheel lying on the higher-μ road surface area is not increased up to the largest possible value, but the cornering force of that rear wheel is increased. In other words, the braking force is sacrificed for the sake of the cornering force. It is desired to minimize the sacrifice of the braking force of the rear wheel lying on the higher-μ road surface area. However, if the higher-μ rear wheel brake cylinder 24 was necessarily communicated with the pump chamber 330 when the lower-μ front wheel brake cylinder 22 in the same pressure application sub-system is communicated with the pump chamber 330 to increase the pressure in the that front wheel brake cylinder 22, the delivery pressure of the pump 320 would be lowered due to the comparatively lower friction coefficient of the road surface area on which the front wheel is running. As a result, the rate of increase of the pressure in the higher-μ rear wheel cylinder 24 is made low, and the braking force applied to the corresponding rear wheel tends to be considerably smaller than required. In the present braking system, however, the lower-μ front wheel brake cylinder 22 is not communicated with the pump chamber 330 when the higher-μ rear wheel brake cylinder 24 in the same sub-system is communicated with the pump chamber 330 to increase the pressure in that rear wheel brake cylinder 24. According to this arrangement, the delivery pressure of the pump 320 when only the higher-μ rear wheel brake cylinder 24 is communicated with the pump chamber 330 is higher than that in the case where the lower-μ front wheel brake cylinder 22 and the higher-μ rear wheel brake cylinder 24 are both communicated with the pump chamber 330. Accordingly, the select-low control would not cause the braking force of the higher-μ rear wheel to be considerably smaller than required, enabling the braking system to provide to an increased overall braking effect.

In the pump 320 of the present embodiment, there exists an annular gap between the piston 326 and the inner circumferential surface of the cylinder bore 324. Therefore, the pressurizing fluid may more or less flow from the pump chamber 330 through this annular gap to the rear wheel brake cylinder 24 even when the piston 326 is placed in the position for opening the delivery port 82 corresponding to the front wheel brake cylinder 22 and closing the delivery port 80 corresponding to the rear wheel brake cylinder 24, and may also more or less flow through the annular gap to the front wheel brake cylinder 24 even when the piston 326 is placed in the position for opening the delivery port 80 and closing the delivery port 82. However, since the gap functions as an orifice, the amount of flow of the fluid through this annular gap into the rear wheel brake cylinder 24 is limited when the delivery port 82 is opened while the delivery port 80 is closed, and the amount of flow of the fluid through the annular gap into the front wheel brake cylinder 22 is limited when the delivery port 80 is opened while the delivery port 82 is closed.

The pump 320 may be likely to generate a noise when the two delivery ports 80, 82 are both closed or when the pump chamber 330 has a relatively large pressure variation, particularly where the components of the pump 320 have relatively low dimensional or positioning accuracy. To minimize the noise, it is desirable to form an annular groove in the outer circumferential surface of the piston 326 so that the pressurized fluid may leak from the pump chamber 330 into the two delivery ports 80, 82 at a suitable rate of low, so as to reduce the pressure variation in the pump chamber 330. The width of this annular groove as measured in the longitudinal direction of the piston 326 is relatively small and selected within a range of 10–100 μm.

Figure 11:
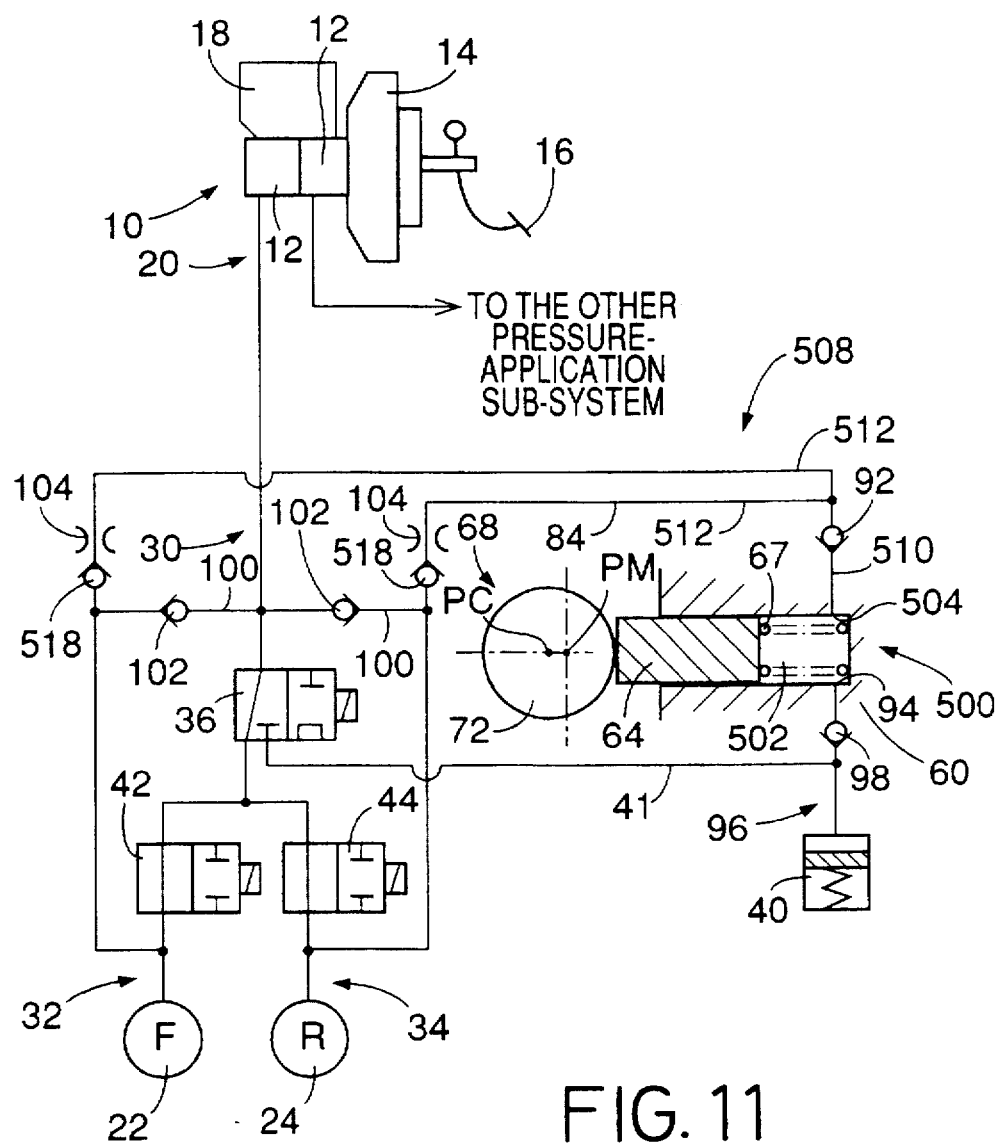
FIG. 11 is a schematic view illustrating a mechanical arrangement of a braking system according to still another embodiment of the invention.

Referring to FIGS. 11 and 12, there will be described a fifth embodiment of this invention.

In the above embodiments, the pump 52, 250, 280, 320 per se incorporates a suitable hardware measure for assuring a sufficiently high rate of increase of the pressure in the higher-pressure wheel brake cylinder, in the braking system wherein the same pump is used as a pressure source commonly for the two brake cylinders. The present fifth embodiment of FIGS. 11 and 12 employs a software measure for achieving the same purpose.

The mechanical arrangement of the present braking system, which is illustrated in FIG. 11, is substantially identical with that illustrated in FIG. 1, except for the elimination of the hardware measure for permitting a high rate of increase of the pressure in the higher-pressure brake cylinder. That is, the present braking system uses a pump 500 constructed as known in the art, which has a pump chamber 502 to which there are open the single suction port 94 and a single delivery port 504. The front and rear wheel brake cylinders 22, 24 in the same pressure application sub-system are connected to the pump chamber 502 through the same delivery port 504. The delivery port 504 is connected to the two wheel brake cylinders 22, 24 through a pump passage 508, which consists of a main line 510 extending from the delivery port 504, and two branch lines 512 which connect the main line 510 and the respective wheel brake cylinders 22, 24. The delivery valve 92 described above is disposed in the main line 510, while the orifice 104 also described above and a check valve 518 are disposed in series in each of the branch lines 512. The check valve 510 permits a flow of the fluid in a direction from the pump chamber 502 toward the wheel brake cylinder 22, 24, and inhibits a flow of the fluid in the reverse direction. Thus, the front and rear wheel brake cylinders 22, 24 are substantially disconnected from each other by the check valves 518.

The present braking system has the electrical arrangement as shown in FIG. 3. However, the select-low control routine stored in the ROM 124 of the computer 128 of the controller 120 is different from that in the first embodiment.

In principle, the select-low control in the present braking system is similar to that in the first embodiment. Namely, the same pressure control mode as used for the lower-μ rear wheel brake cylinder is selected for the higher-μ rear wheel brake cylinder. However, the present select-low control is adapted to shorten the pressure-decrease time for the higher-μ rear wheel brake cylinder, if the difference between the friction coefficients of the higher-μ and lower-μ road surface areas (right and left areas of an uneven-friction-coefficient road surface) is larger than a predetermined threshold. Although the rate of increase of the pressure in the higher-μ rear wheel brake cylinder is relatively low due to reduction of the pump delivery pressure in the select-low control, the shortening of the time of each pressure-decrease operation of the higher-μ rear wheel brake cylinder which precedes or follows the pressure-increase operation of the same will result in increasing the overall rate of increase of the pressure of the higher-μ rear wheel brake cylinder during the entire select-low control period. Thus, the present arrangement is effective to maximize the overall braking force produced by the higher-μ rear wheel brake cylinder during the entire select-low control period.

To determine whether the difference between the friction coefficients of the right and left road surface areas is larger than the predetermined threshold, the controller 120 is adapted to: obtain number $ND_{FR}$ of pressure decrease operations of the front right wheel brake cylinder 22 (number of times of selection of the pressure-decrease mode) within a predetermined length of time; obtain number $ND_{FL}$ of pressure decrease operations of the front left wheel brake cylinder 22; calculate a difference ΔND between the obtained numbers $ND_{FR}$ and $ND_{FL}$; and determine whether the absolute value of the calculated difference ΔND is larger than a predetermined reference value A. If the absolute value |ΔND| is larger than the reference value A, it means that the difference of the friction coefficients of the right and left road surface areas is larger than the threshold value.

The controller 120 is further adapted to shorten the pressure-decrease time of the higher-μ rear wheel brake cylinder in the following manner. If a decision is made to shorten the pressure-decrease time of the higher-μ rear wheel brake cylinder, the pressure-decrease mode for the higher-μ rear wheel brake cylinder which is selected next upon selection of the pressure-decrease for the lower-μ rear wheel brake cylinder is replaced by the pressure-hold mode (or pressure-increase) mode, so that the next pressure-decrease operation which would be normally performed for the higher-μ rear wheel brake cylinder is inhibited. In the case where the absolute value of the difference ΔND is larger than the predetermined reference value A, it generally means that the numbers $ND_{FR}$, $ND_{FL}$ of pressure decrease operations of the front wheel brake cylinders are larger than one, and that the numbers of pressure decrease operations of the rear wheel brake cylinders are also larger than one. Therefore, the replacement of the pressure-decrease mode by the pressure-hold or pressure-increase mode for the higher-μ rear wheel brake cylinder results in inhibiting one pressure decrease operation of the higher-μ rear wheel brake cylinder for a given number of pressure decrease operations of the same. As a result, the total time of the pressure decrease operations of the higher-μ rear wheel brake cylinder during the entire anti-lock pressure control operation in question is shortened.

The controller 120 relies on the sign of the difference ΔND, to determine which one of the rear right and left wheel brake cylinders should be subjected to the inhibition of the pressure decrease operation. Described in detail, if the difference ΔND is positive, it means that the front right wheel is on the lower-μ road surface area, while the rear left wheel is on the higher-μ road surface area. In this case, the pressure-decrease mode of the higher-μ rear left wheel brake cylinder is replaced by the pressure-hold or pressure-increase mode. If the difference ΔND is negative, it means that the front left wheel is on the lower-μ road surface area, while the rear right wheel is on the higher-μ road surface area. In this case, the pressure-decrease mode of the higher-μ rear right wheel brake cylinder is replaced by the pressure-hold or pressure-increase mode.

For controlling the braking system of the present embodiment, the ROM 124 of the controller 120 stores a routine as illustrated in the flow chart of FIG. 12, for selectively permitting or inhibiting a pressure decrease operation for the rear wheel brake cylinder, as described above. This routine uses two pressure-decrease inhibit flags which are set and reset for the rear left and right wheel brake cylinders. The pressure decrease operation of each rear wheel brake cylinder is inhibited when the corresponding inhibit flag is set, and is permitted when the inhibit flag is reset. The routine of FIG. 12 will be described in detail.

The routine is initiated with step S101 to calculate the number $ND_{FR}$ of pressure decrease operations of the front right wheel brake cylinder 22 which have been performed in a predetermined time interval during an anti-lock pressure control operation of the braking system. Step S102 is then implemented to calculate the number $ND_{FL}$ of pressure decrease operation of the front left wheel brake cylinder 22 in the predetermined tine interval.

Then, the control flow goes to step S103 to calculate the difference $ΔND=ND_{FR}-ND_{FL}$, by subtracting the number $ND_{FL}$ from the number $ND_{FR}$. Step S103 is followed by step S104 to determine whether the difference ΔND is larger than the positive reference value A. If the right and left areas of the road surface have substantially the same friction coefficient, and the difference ΔND is not larger than the positive reference value A, a negative decision (NO) is obtained in step S104, and the control flow goes to step S105 to determine whether the difference ΔND is smaller than the negative reference value A. If the road surface has substantially the same friction coefficient in the right and left areas, and the difference ΔND is not smaller than the negative reference value A, a negative decision (NO) is obtained in step S105, and the control flow goes to step S106 to reset the two pressure-decrease inhibit flags for the rear right and left wheel brake cylinders. Under the present condition in which the friction coefficients of the right and left areas of the road surface are not so different from each other, an insufficient rate of increase of the pressure in the higher-μ rear wheel brake cylinder 24 is not expected as a result of effecting the anti-lock pressure control operation in the select-low control fashion. Thus, one cycle of execution of the routine of FIG. 12 is terminated.

The difference ΔND becomes larger than the positive reference value A if the difference between the friction coefficients of the right and left areas of the road surface is larger than a given amount where the friction coefficient of the right area of the road surface is lower than that of the left area. In this case, an affirmative decision (YES) is obtained in step S104, and the control flow goes to step S107 in which the pressure-decrease inhibit flag for the rear left wheel brake cylinder 24 is set to inhibit the next pressure decrease operation for this rear left wheel brake cylinder 24, which is in the same pressure application sub-system as the front right wheel brake cylinder for the front right wheel lying on the right road surface area having a lower friction coefficient. That is, the pressure in the higher-μ rear left wheel brake cylinder 24 would be insufficient if it was controlled in the normal select-low control fashion in this road surface condition.

The difference ΔND becomes smaller than the negative reference value A if the difference between the friction coefficients of the right and left areas of the road surface is larger than the given amount where the friction coefficient of the left area of the road surface is lower than that of the right area. In this case, a negative decision (NO) is obtained in step S104, and an affirmative decision (YES) is obtained in step S105, whereby the control flow goes to step S108 in which the pressure-decrease inhibit flag for the rear right wheel brake cylinder 24 is set to inhibit the next pressure decrease operation for this rear right wheel brake cylinder 24, which is in the same pressure application sub-system as the front left wheel brake cylinder for the front left wheel lying on the left road surface area having a lower friction coefficient. That is, the pressure in the higher-μ rear right wheel brake cylinder 24 would be insufficient if it was controlled in the normal select-low control fashion in this road surface condition.

The pressure-decrease flags for the rear right and left wheel brake cylinders, which are set and reset according to the routine as described above, are monitored at a predetermined interval during the anti-lock pressure control operation, and the pressure decrease operations of the rear right and left wheel brake cylinders 24 are inhibited as needed, depending upon the inhibit flags, according to the anti-lock pressure control routine.

When the two pressure-decrease flags for the rear wheel brake cylinders are both reset, that is, when the difference of the friction coefficients of the right and left areas of the road surface is not larger than the predetermined threshold or reference value A, the pressures in the rear wheel brake cylinders may be controlled as described below, for example. Initially, the pressure control modes are selected for the rear right and left wheel brake cylinders, depending upon the locking tendencies of the corresponding rear right and left wheels. If the different pressure control modes are initially selected for the two rear wheel brake cylinders, one of these pressure control modes which causes more reduction of the pressure is re-selected commonly for the two rear wheel brake cylinders, so that the pressures in the two rear wheel brake cylinders are subsequently controlled in the re-selected pressure control mode. According to this select-low control arrangement, the pressure control mode that should be selected for the lower-μ rear wheel brake cylinder is also used for the higher-μ rear wheel brake cylinder.

While the present invention has been described above in detail in its presently preferred embodiments, it is to be understood that the invention may be embodied with various changes and improvements, which may occur to those skilled in the art, without departing from the spirit and scope of the invention defined in the following claims:

What is claimed is:

1. A braking system comprising:
   a reservoir;
   two brake cylinders;
   a pump adapted to pressurize a working fluid received from said reservoir and distribute the pressurized fluid to the two brake cylinders, said pump including a housing having a cylinder bore formed therein, and a piston received in said cylinder bore such that the cylinder bore is closed at one end thereof and such that said piston and said housing cooperate to define a pump chamber connected to said reservoir through a suction port, said piston being reciprocated so as to change a volume of said pump chamber for thereby repeating a suction and a delivery stroke alternately;
   said pump having two delivery ports which are open to said pump chamber and which are mutually independently connected to said two brake cylinders, respectively;
   said pump comprising disconnecting means for closing one of said two delivery ports while opening the other of said two delivery ports, in at least a portion of said delivery stroke of said piston;
   a solenoid-operated pressure control device disposed between said reservoir and pump and said two brake cylinders; and
   a controller for controlling said solenoid-operated pressure control device to electrically regulate pressures of the working fluid in said two brake cylinders.

2. A braking system according to claim 1, wherein said pump further comprises a valve member, and a valve seat on which said valve member is seated to close said of said two delivery ports in said portion of said delivery stroke of said piston.

3. A braking system according to claim 2, wherein said pump further comprises a spring disposed between said valve member and said piston, for biasing said valve member in a direction toward said valve seat, and a stop fixed to said piston for limiting a distance of said valve member from said piston in a direction of reciprocation of said piston.

4. A braking system according to claim 2, wherein said pump further comprises a first spring disposed between said valve member and said housing, for biasing said valve member in a direction away from said valve seat, a stop fixed to said housing for limiting a distance of said valve member from said valve seat, and a second spring disposed between said piston and said valve member, for biasing said valve member in a direction toward said valve seat.

5. A braking system according to claim 1, wherein said two delivery ports are formed in said housing so as to be open to said pump chamber at respective positions which are spaced apart from each other in a direction of reciprocation of said piston, said piston including a front end portion which partially defines said pump chamber and which functions as a valve spool for opening and closing, during reciprocation of said piston, only said one of said two delivery ports which is located nearer to said other of said two delivery ports, to a fully retracted position of said piston at which the volume of said pump chamber is the largest.

6. A braking system according to claim 1, wherein said two delivery ports are formed in said housing so as to be open to said pump chamber at respective positions which are spaced apart from each other in a direction of reciprocation of said piston, said piston including a front end portion, a rear end portion, and an axially intermediate portion between said front and rear end portions, said axially intermediate portion having an annular groove formed in an outer circumferential surface and held in communication with said pump chamber, said front end portion functioning as a valve spool for opening and closing said two delivery ports during reciprocation of said piston such that said other of said two delivery ports is open while said one of said two delivery ports is closed.

7. A braking system according to claim 1, wherein said pump is provided for each of two pressure application sub-systems each including said two brake cylinders.

8. A braking system of diagonal or X-crossing type for a four-wheel motor vehicle having a front right, a front left, a rear right and a rear left wheel, said braking system comprising two pressure application sub-systems which are connected to respective two pressurizing chambers of a master cylinder, each of said sub-systems including (a) a reservoir, (b) a front wheel brake cylinder for one of said front right and left wheels, and a rear wheel brake cylinder for one of said rear right and left wheels which is located diagonally with respect to said one of said front right and left wheels, (c) a pump adapted to pressurize a working fluid received from said reservoir and distribute the pressurized fluid to said front and rear wheel brake cylinders, and (d) a solenoid-operated pressure control device disposed between said reservoir and pump and said front and rear wheel brake cylinders, said braking system comprising a controller for controlling said solenoid-operated pressure control device of said each pressure application sub-system to electrically regulate pressures of said working fluid in said front and rear wheel brake cylinders of said each sub-system in an anti-lock manner so as to prevent locking of the corresponding wheels, such that during running of the motor vehicle on an uneven-friction-coefficient road surface whose right and left areas have different friction coefficients, the pressure in the rear wheel brake cylinder which belongs to one of said two sub-systems and which corresponds to the rear wheel lying on one of said right and left areas which has a higher friction coefficient is controlled in the same manner as the pressure in the rear wheel brake cylinder which belongs to the other of said two sub-systems and which corresponds to the rear wheel lying on the other area having a lower friction coefficient, wherein the improvement comprises:

said controller controlling said solenoid-operated pressure control devices of said two pressure application sub-systems such that when a difference between the friction coefficients of said right and left areas of said uneven-friction-coefficient road surface is larger than a predetermined threshold, said pressure control devices are controlled to effect at least one of: shortening a pressure-decrease time during which the pressure in the rear wheel brake cylinder belonging to said one of said two sub-systems is reduced, as compared with a pressure-decrease time during which the pressure in the rear wheel brake cylinder belonging to said other of said two sub-systems is reduced; and increasing a pressure-increase time during which the pressure in the rear wheel brake cylinder belonging to said one of said two sub-systems is increased, as compared with a pressure-increase time during which the pressure in the rear wheel brake cylinder belonging to said other sub-system is increased, wherein said controller comprises friction-coefficient difference determining means for determining whether said difference between the friction coefficients of said right and left areas of said uneven-friction-coefficient road surface is larger than said predetermined threshold, said friction-coefficient difference determining means comprising (a) means for obtaining a first number of pressure-decrease operations which have been performed in a predetermined time period during a series of anti-lock pressure control operations, for the front wheel brake cylinder which belongs to said one sub-system and which corresponds to the front wheel lying on said other area having a lower friction coefficient, and (b) means for obtaining a second number of pressure-decrease operations which have been performed in said predetermined time period during said series of anti-lock pressure control operations, for the front wheel brake cylinder which belongs to said other sub-system and which corresponds to the front wheel lying on said one area having a higher friction coefficient, said friction-coefficient different determining means determining whether said difference is larger than said predetermined threshold, on the basis of a relation between said first and second numbers of said pressure-decrease operations.

9. A braking system according to claim 8, wherein said controller further comprises:

select-low control means operated when said friction-coefficient difference determining means has determined that said difference is larger than said predetermined threshold, for selecting for the rear wheel brake cylinder belonging to said other sub-system, one of a plurality of pressure control modes including a pressure-decrease mode and a pressure-increase mode, depending upon a locking tendency of the corresponding rear wheel, so that the selected pressure control mode is suitable for holding a slip ratio of said corresponding rear wheel within a predetermined optimum range, said select-low control means provisionally selecting for the rear wheel brake cylinder belonging to said one sub-system, the pressure control mode which has been selected for the rear wheel brake cylinder belonging to said other sub-system; and adjusting means for changing the pressure control mode provisionally selected by said select-low control means, such that the number of pressure-decrease operations to be performed for the rear wheel brake cylinder belonging to said one sub-system during said series of anti-lock pressure control operations of the braking system is smaller than the number of pressure-decrease operations to be performed for the rear wheel brake cylinder belonging to said other sub-system.

10. A braking system according to claim 9, wherein said friction-coefficient difference determining means further comprises:

(c) means for obtaining an absolute value of a difference between said first and second numbers of pressure-decrease operations; and (d) means for determining that said difference between the friction coefficients of said right and left areas of the road surface is larger than said predetermined threshold, if said absolute value is larger than a predetermined reference value.

11. A braking system according to claim 9, wherein said friction-coefficient difference determining means further comprises:

(c) means for obtaining a ratio by dividing said first number by said second number; and (d) means for determining that said difference between the friction coefficients of said right and left areas of the road surface is larger than said predetermined threshold, if said ratio is larger than a predetermined reference value.

12. A braking system according to claim 9, wherein when said select-low control means provisionally selects said pressure-decrease mode for the rear wheel brake cylinder belonging to said one sub-system as well as for the rear wheel brake cylinder belonging to said other sub-system, said adjusting means replaces said provisionally selected pressure-decrease mode to said pressure-increase mode or a pressure-hold mode, to thereby inhibit at least one of said pressure-decrease operations to be performed for said rear wheel brake cylinder belonging to said one sub-system, after said friction-coefficient difference determining means has determined that said difference is larger than said predetermined threshold, whereby the number of said pressure-decrease operations to be performed for the rear wheel brake cylinder belonging to said one sub-system during said series of anti-lock pressure control operations is smaller than the number of said pressure-decrease operations to be performed for the rear wheel brake cylinder belonging to said other sub-system.

13. A braking system according to claim 8, wherein said controller inhibits, for a predetermined time, a change of the pressure control mode for the rear wheel brake cylinder belonging to said one sub-system, from said pressure-increase mode to another of said plurality of pressure control modes which is selected by said select-low control means for said rear wheel brake cylinder belonging to said other sub-system, after said friction-coefficient difference determining means has determined that said difference is larger than said predetermined threshold, so that a total pressure-increase time during which the pressure in the rear wheel brake cylinder belonging to said one sub-system is increased during said series of anti-lock pressure control operations is made longer than that of the rear wheel brake cylinder belonging to said other sub-system.

* * * * *

UNITED STATES PATENT AND TRADEMARK OFFICE
CERTIFICATE OF CORRECTION

PATENT NO. : 5,788,342
DATED : 4 August 1998
INVENTOR(S) : Noboru NOGUCHI et al.

It is certified that error appears in the above-identified patent and that said Letters Patent is hereby corrected as shown below:

In the Abstract, line 7: Change "cylinder" to --cylinders--.

| Column | Line | |
|---|---|---|
| 1 | 22 | Change "appropriate." to --appropriate).--. |
| 2 | 29 | Change "itensified curve" to --identified above--. |
| 2 | 55 | Change "surface will" to --surface, will--. |
| 3 | 35 | After "cylinders" insert --,--. |
| 4 | 44 | Delete "which" (second occurrence). |
| 4 | 46 | Change "t he" to --the--. |
| 4 | 59 | Change "th e" to --the--. |
| 6 | 36 | Before "pressurize" insert --to--. |

UNITED STATES PATENT AND TRADEMARK OFFICE
CERTIFICATE OF CORRECTION

PATENT NO. : 5,788,342

DATED : 4 August 1998

INVENTOR(S) : Noboru NOGUCHI et al.

It is certified that error appears in the above-identified patent and that said Letters Patent is hereby corrected as shown below:

| Column | Line | |
|---|---|---|
| 6 | 42 | Before "each" delete "the". |
| 6 | 45 | Before "each" delete "the". |
| 6 | 66 | Change "pressure=decrease" to --pressure-decrease--. |
| 7 | 4 | Change "sub-system" to --sub-systems--. |
| 7 | 35 | Delete "the difference of". |
| 9 | 7 | Change "pressure decrease-operations" to --pressure-decrease operations--. |
| 10 | 42 | Change "chamber" to --chambers--. |
| 10 | 44 | Change "brake pedal 14" to --brake pedal 16--. |
| 11 | 32 | Change "cylinder" to --cylinders--. |
| 11 | 33 | Change "value 42, 44" to --values 42, 44--. |
| 11 | 34 | Change "value 42, 44" to --values 42, 44--. |

UNITED STATES PATENT AND TRADEMARK OFFICE
CERTIFICATE OF CORRECTION

PATENT NO. : 5,788,342

DATED : 4 August 1998

INVENTOR(S) : Noboru NOGUCHI et al.

It is certified that error appears in the above-identified patent and that said Letters Patent is hereby corrected as shown below:

| Column | Line | |
|---|---|---|
| 11 | 36 | Change "cylinder" to --cylinders--. |
| 11 | 40 | Change "value 42, 44" to --values 42, 44--. |
| 11 | 41 | Change "cylinder" to --cylinders--. |
| 12 | 37 | Before "sucked" insert --is--. |
| 12 | 52 | Change "branch line" to --branch lines--. |
| 12 | 57 | Change "pump passage" to --pump passages--. |
| 13 | 18 | Change "cylinder" to --cylinders--. |
| 13 | 54 | Delete "up". |
| 15 | 7 | Change "cylinder" to --cylinders--. |
| 15 | 36 | Change "lowerµ" to --lower-µ--. |
| 16 | 17 | Change "even-frictioncoefficient" to --even-friction-coefficient--. |
| 16 | 25 | Change "coefficient a" to --coefficient α--. |

UNITED STATES PATENT AND TRADEMARK OFFICE
CERTIFICATE OF CORRECTION

PATENT NO. : 5,788,342

DATED : 4 August 1998

INVENTOR(S) : Noboru NOGUCHI et al.

It is certified that error appears in the above-identified patent and that said Letters Patent is hereby corrected as shown below:

| Column | Line | |
|---|---|---|
| 16 | 61-62 | Change "coefficient a" to --coefficient α-- (two occurrences) |
| 17 | 4-5 | Change "coefficient a" to --coefficient α--. |
| 17 | 18 | Change "deliver port" to --delivery port--. |
| 17 | 63 | Change "surfaces" to --surface--. |
| 19 | 5 | Change "matters" to --matter--. |
| 19 | 6 | Change "matters" to --matter--. |
| 19 | 16 | Change "matters" to --matter--. |
| 19 | 27 | Change "shutOoff valve" to --shut-off valve--. |
| 19 | 55 | Change "passage" to --passages--. |
| 19 | 56 | Change "cylinder" to --cylinders--. |
| 19 | 57 | Change "cylinder" to --cylinders--. |

UNITED STATES PATENT AND TRADEMARK OFFICE
CERTIFICATE OF CORRECTION

PATENT NO. : 5,788,342
DATED : 4 August 1998
INVENTOR(S) : Noboru NOGUCHI et al.

It is certified that error appears in the above-identified patent and that said Letters Patent is hereby corrected as shown below:

| Column | Line | |
|---|---|---|
| 20 | 64 | Change "2292" to --292--. |
| 21 | 22 | After "and" delete "the" (second occurrence). |
| 23 | 29 | Before "front" delete "that". |
| 23 | 51 | After "vide" delete "to". |
| 26 | 19 | Change "tine" to --time--. |
| 26 | 21 | Change "$\Delta ND=ND_{FR}ND_{FL}$" to --$\Delta ND=ND_{FR}-ND_{FL}$--. |
| 28 | 9 | Change "said of said two" to --said one of said two--. |

Signed and Sealed this

Fourteenth Day of December, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,788,342
DATED : Aug. 4, 1998
INVENTOR(S) : Noguchi

It is certified that error appears in the above-identified patent and that said Letters Patent is hereby corrected as shown below:

Column 2, line 54, " cylinder is effected" should read -- cylinder is affected--.
Column 2, line 56, " effect" should read -- affect--.

Signed and Sealed this

Twenty-ninth Day of February, 2000

Attest:

Q. TODD DICKINSON

Attesting Officer

Commissioner of Patents and Trademarks